United States Patent
Yamada et al.

(10) Patent No.: US 8,790,172 B2
(45) Date of Patent: Jul. 29, 2014

(54) GAME PROVIDING APPARATUS AND RECORDING MEDIUM

(71) Applicant: DeNA Co., Ltd., Tokyo (JP)

(72) Inventors: Hiroki Yamada, Tokyo (JP); Kazuhiro Kondo, Tokyo (JP); Nobutaka Takushima, Tokyo (JP); Hiroki Matsushima, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/024,747

(22) Filed: Sep. 12, 2013

(65) Prior Publication Data

US 2014/0135119 A1 May 15, 2014

(30) Foreign Application Priority Data

Nov. 14, 2012 (JP) .................................. 2012-250195

(51) Int. Cl.
*A63F 13/00* (2014.01)
*A63F 9/24* (2006.01)
*A63F 13/10* (2006.01)

(52) U.S. Cl.
CPC ......... *A63F 13/10* (2013.01); *A63F 2300/6045* (2013.01); *A63F 2300/6054* (2013.01); *A63F 2300/6623* (2013.01); *A63F 2300/65* (2013.01); *A63F 2300/8029* (2013.01); *A63F 2300/807* (2013.01)
USPC ......................... 463/9; 463/1; 463/32; 463/42

(58) Field of Classification Search
None
See application file for complete search history.

(56) References Cited

U.S. PATENT DOCUMENTS

| | | | |
|---|---|---|---|
| 2001/0026265 A1* | 10/2001 | Kikuchi et al. | 345/157 |
| 2002/0045470 A1* | 4/2002 | Atsumi et al. | 463/1 |
| 2005/0119050 A1* | 6/2005 | Suzuki | 463/36 |
| 2005/0167914 A1* | 8/2005 | Kenney | 273/242 |
| 2005/0221880 A1* | 10/2005 | Kando | 463/9 |
| 2006/0135237 A1* | 6/2006 | Tsuda | 463/9 |
| 2006/0246974 A1* | 11/2006 | Tsuda et al. | 463/7 |
| 2008/0125220 A1* | 5/2008 | Sakaguchi | 463/32 |

FOREIGN PATENT DOCUMENTS

JP   2012-040059   3/2012

* cited by examiner

*Primary Examiner* — Dmitry Suhol
*Assistant Examiner* — Jason Yen
(74) *Attorney, Agent, or Firm* — IPUSA, PLLC

(57) ABSTRACT

A game providing apparatus connected to a terminal device to be capable of having communication with the terminal device to provide a game in which a player selects a plurality of characters to participate in the game, includes a display image generation unit that synthesizes a plurality of character positioning areas at which a plurality of characters are to be positioned, respectively, and a plurality of characters positioned at the plurality of character positioning areas, respectively, to have the terminal device display the synthesized image; and a character selection unit that selects, when one of the characters is designated and a direction from the designated character having the designated character as a base point is designated by the terminal device, the designated character and the character positioned at the character positioning area that are in the designated direction, as a combination of characters to actually participate in the battle.

11 Claims, 20 Drawing Sheets

FIG.5A

| PLAYER ID | PLAYER NAME | STATUS | ... |
|---|---|---|---|
| 1 | AAA | 16 | ... |
| 2 | BBB | 1 | ... |
| 3 | CCC | 2 | ... |
| .. | .. | .. | .. |

FIG.5B

| PLAYER ID | POSSESSING CHARACTER ID | CHARACTER NAME | CHARACTER IMAGE | CHARACTER STRENGTH (LEVEL, HP, MP, OFFENCE, DEFENSE...) | ... |
|---|---|---|---|---|---|
| 1 | 1 | FIGHTER | 1.gif | 37/505/0/215/189/... | ... |
| 1 | 2 | DRAGON | 2.gif | 35/306/0/158/147/... | ... |
| 1 | 3 | PHOENIX | 3.gif | 37/1040/200/265/178/... | ... |
| .. | .. | .. | .. | .. | .. |

FIG.6A

| 1-a | 2-a | 3-a |
|---|---|---|
| 1-b | 2-b | 3-b |
| 1-c | 2-c | 3-c |

FIG.6B

| BOX IN MATRIX | POSITIONED CHARACTER ID | SELECTABLE COMBINATION |
|---|---|---|
| 1-a | | 1-a/2-a/3-a,1-a/1-b/1-c,1-a/2-b/3-c |
| 1-b | | 1-a/1-b/1-c,1-b/2-b/3-b |
| 1-c | | 1-a/1-b/1-c,1-c/2-c/3-c,1-c/2-b/3-a |
| 2-a | | 2-a/2-b/2-c, 1-a/2-a/3-a |
| 2-b | | 2-a/2-b/2-c,1-b/2-a/3-b,1-a/2-a/3-c,3-a/2-a/1-c |
| 2-c | | 2-a/2-b/2-c,1-c/2-c/3-c |
| 3-a | | 3-a/3-b/3-c,1-a/2-a/3-a,3-a/2-b/2-c |
| 3-b | | 3-a/3-b/3-c,1-b/2-b/3-b |
| 3-c | | 3-a/3-b/3-c,1-c/2-c/3-c,1-a/2-b/3-c |

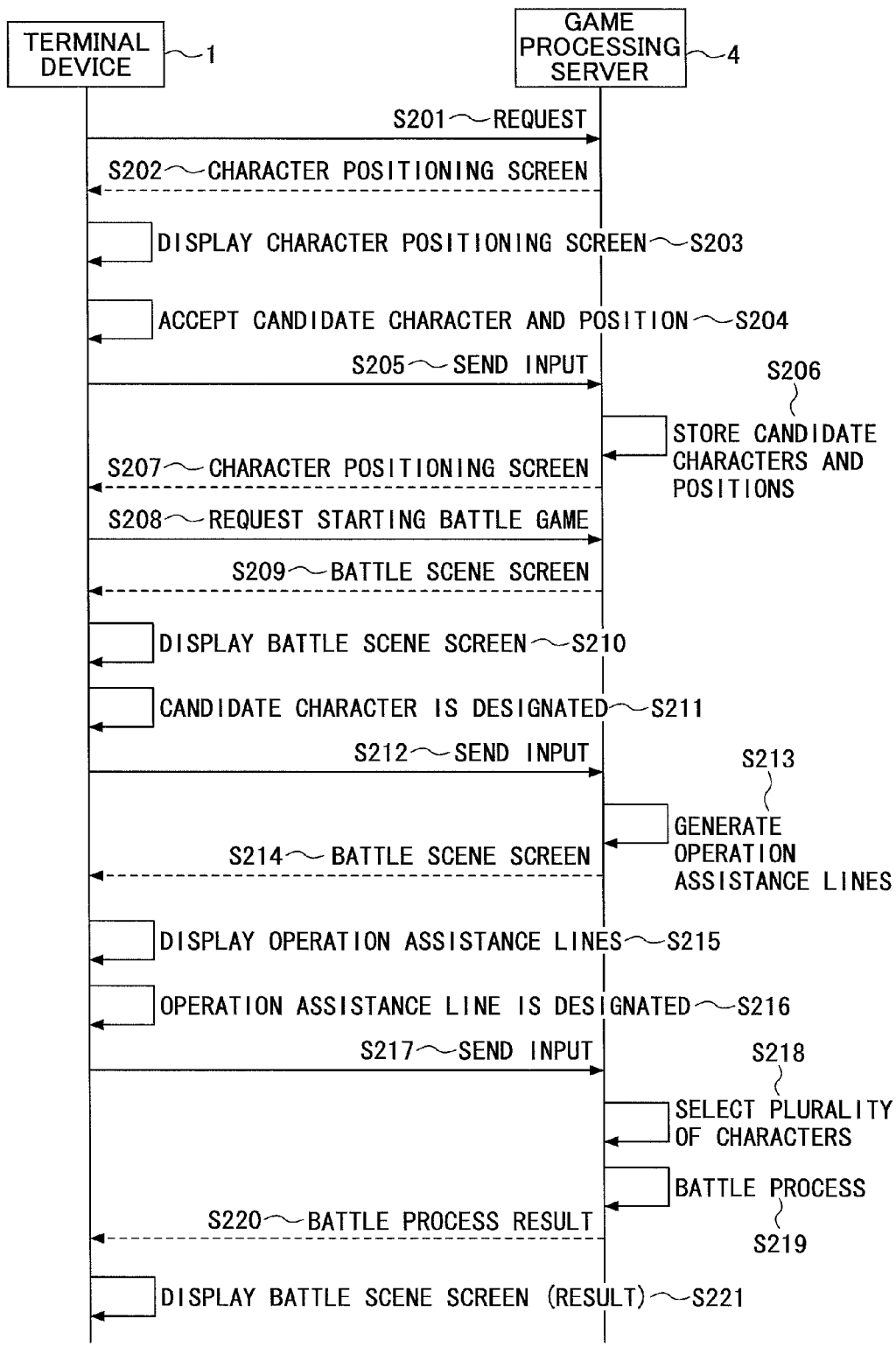

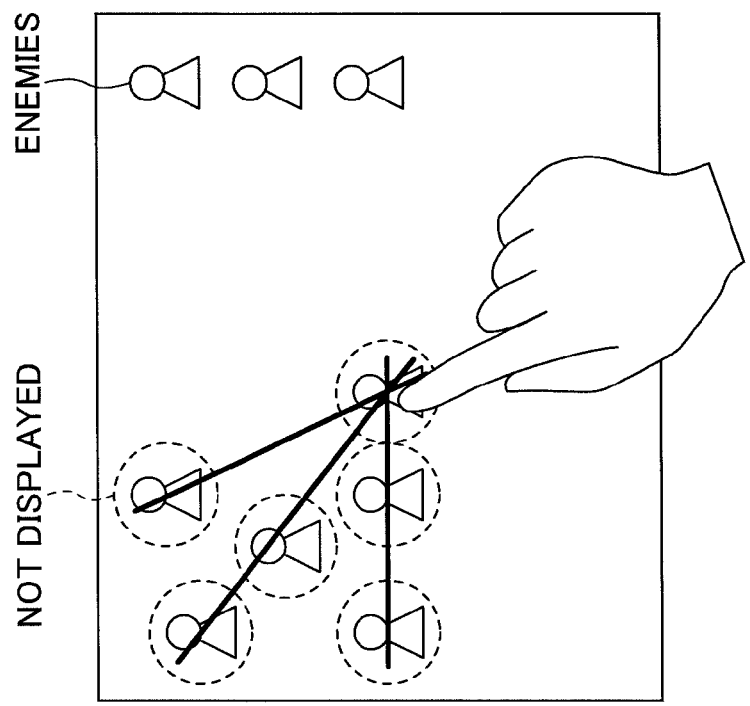
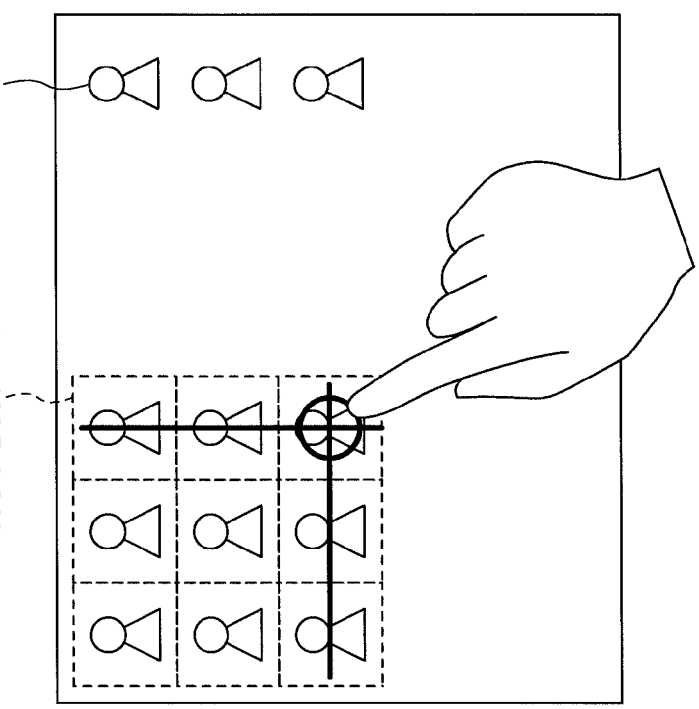

GAME PROVIDING APPARATUS AND RECORDING MEDIUM

BACKGROUND OF THE INVENTION

1. Field of the Invention

The present invention relates to a game providing apparatus and a recording medium.

2. Description of the Related Art

Conventionally, in a battle scene in a role-playing game (RPG) or the like, a player (user) may select in advance characters to participate in a battle from a character list of characters possessed by the player, or may select characters to participate in the battle for each battle (or each battle turn in the battle) (see Patent Document 1, for example).

Here, if friend (ally) characters to participate in the battle are chosen in advance of the battle, suitable friend characters cannot be selected according to the enemy characters to be fought against, the statuses of friend characters that have changed due to the battle cannot be taken into account, and the game becomes one in which battle strategy is lacking.

On the other hand, if the friend characters to participate in the battle are selected for each of the battles, it is possible for the player to advance the battle with various strategies as the player can select the friend characters to participate in the battle for each of the battles.

However, if the friend characters are selected for each of the battles, the battle is interrupted while selecting the friend characters. Thus, the sense of being engaged or immersed in the battle scene may be lost.

Further, in a case where the player fights the battle with another player in an on-line game in which the player plays a game while having communication with other players, the other players have to wait while the player is selecting the characters to participate in the battle. Thus, the player has to select the characters within a short period in order not to have the other players wait, so that it is difficult for the player to select the characters with various strategies.

Further, recently, there are a lot of battle games in which a plurality of friend characters can participate in a battle. Thus, the period for selecting the plurality of friend characters becomes longer.

PATENT DOCUMENT

[Patent Document 1] Japanese Laid-open Patent Publication No. 2012-040059

SUMMARY OF THE INVENTION

The present invention is made in light of the above problems, and provides a game providing apparatus and a recording medium by which a player can strategically select characters within a short period.

According to an embodiment, there is provided a non-transitory computer-readable recording medium having recorded thereon a program that causes a computer, which is a terminal device connected to a game providing apparatus to be capable of having communication with the game providing apparatus to perform a game in which a player selects a plurality of characters to participate in the game, to execute functions including: a screen display function that displays a plurality of character positioning areas at which a plurality of characters are to be positioned, respectively, and a plurality of characters positioned at the plurality of character positioning areas, respectively; and a character selection function that selects, when one of the characters is designated and a direction from the designated character having the designated character as a base point is designated, the designated character and the character positioned at the character positioning area that are in the designated direction, as a combination of characters to actually participate in the battle.

According to another embodiment, there is provided a game providing apparatus connected to a terminal device to be capable of having communication with the terminal device to provide a game in which a player selects a plurality of characters to participate in the game, including: a display image generation unit that synthesizes a plurality of character positioning areas at which a plurality of characters are to be positioned, respectively, and a plurality of characters positioned at the plurality of character positioning areas, respectively, to have the terminal device display the synthesized image; and a character selection unit that selects, when one of the characters is designated and a direction from the designated character having the designated character as a base point is designated by the terminal device, the designated character and the character positioned at the character positioning area that are in the designated direction, as a combination of characters to actually participate in the battle.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5A and FIG. 5B are respective views illustrating an example of a data structure of player information of the embodiment;

FIG. 6A is a view illustrating an example of predetermined character positioning areas at which candidate characters to participate in a battle are positioned;

FIG. 6B is a view illustrating an example of a table for storing candidate characters positioned at the character positioning areas, respectively, to participate in a battle;

FIG. 18 is a sequence diagram illustrating an example of an operation of the embodiment for a browser type;

FIG. 20A and FIG. 20B are respective views illustrating alternative examples of the character positioning areas.

DETAILED DESCRIPTION OF THE PREFERRED EMBODIMENTS

Figure 1:
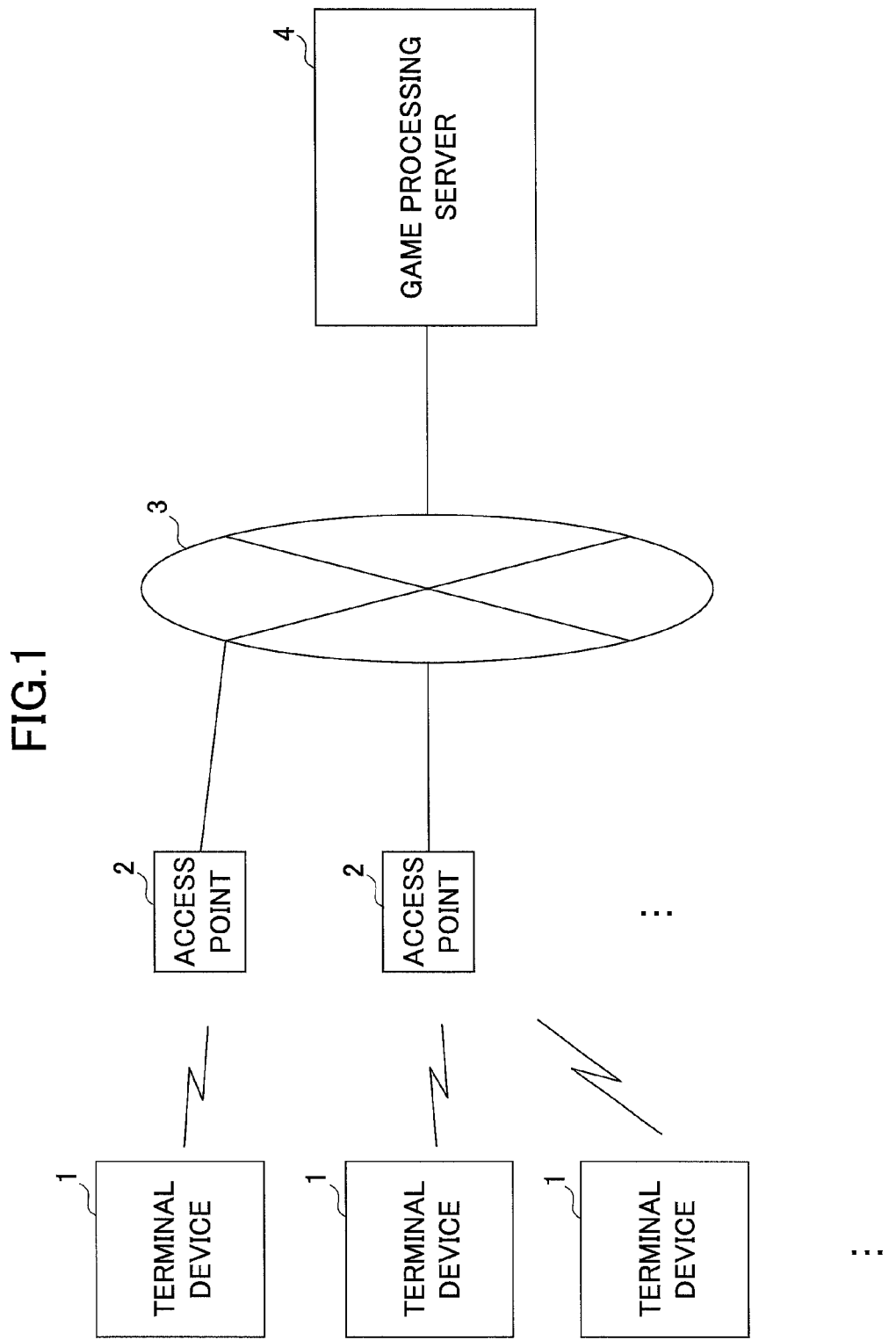
FIG. 1 is a block diagram illustrating an example of a structure of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

The present embodiment relates to a battle game in which a plurality of characters on a player side and a plurality of enemy characters fight a team battle until all of the characters on either side are beaten (or until a predetermined turn), as is often seen in a role-playing game (RPG). According to the battle game of the embodiment, a battle is started when a player meets an enemy in the battle game and selects a plurality of friend characters to participate in the battle among friend characters possessed by the player.

Although the player is capable of increasing the number of the friend characters by increasing friends in a game story, adding friend character cards or the like, the number of the friend characters that can participate in each battle is limited by a game rule. The number of the friend characters that can participate in each battle may be three, for example. Thus, it is necessary for the player to strategically select the friend characters to participate in the battle according to the enemy characters, in order to advantageously fight the battle.

Here, if each of the plurality of friend characters to participate in the battle is selected for each of the battles, the battle is interrupted while selecting the friend characters. Thus, the sense of being engaged or immersed in the battle scene may be lost. Further, when the player fights against another player in an on-line game or the like, the other player has to wait while the player is selecting the friend characters to participate in the battle.

As such, in a battle game in which a plurality of characters fight a team battle, while it is necessary for a player to strategically select friend characters to participate in the battle in order to advantageously fight the battle, it is also necessary for the player to select the friend characters to participate in the battle within a period as short as possible in order to reduce the selection time.

Thus, according to the battle game of the embodiment, a player can strategically select friend characters to participate in a battle within a short period, as the friend characters can be easily selected while the battle in the battle game is being performed.

(Structure)

FIG. 1 is a block diagram illustrating an example of a structure of a system of the embodiment.

The system includes terminal devices (player terminals) 1 such as a smartphone, a mobile phone or the like possessed by a player of a game, an access point 2 such as a mobile station, a Wi-Fi station or the like, a network 3 such as INTERNET or the like, a social game processing server (hereinafter, referred to as a game processing server) 4 that manages (controls) a game played by a plurality of players via the network 3.

(Hardware)

Figure 2:
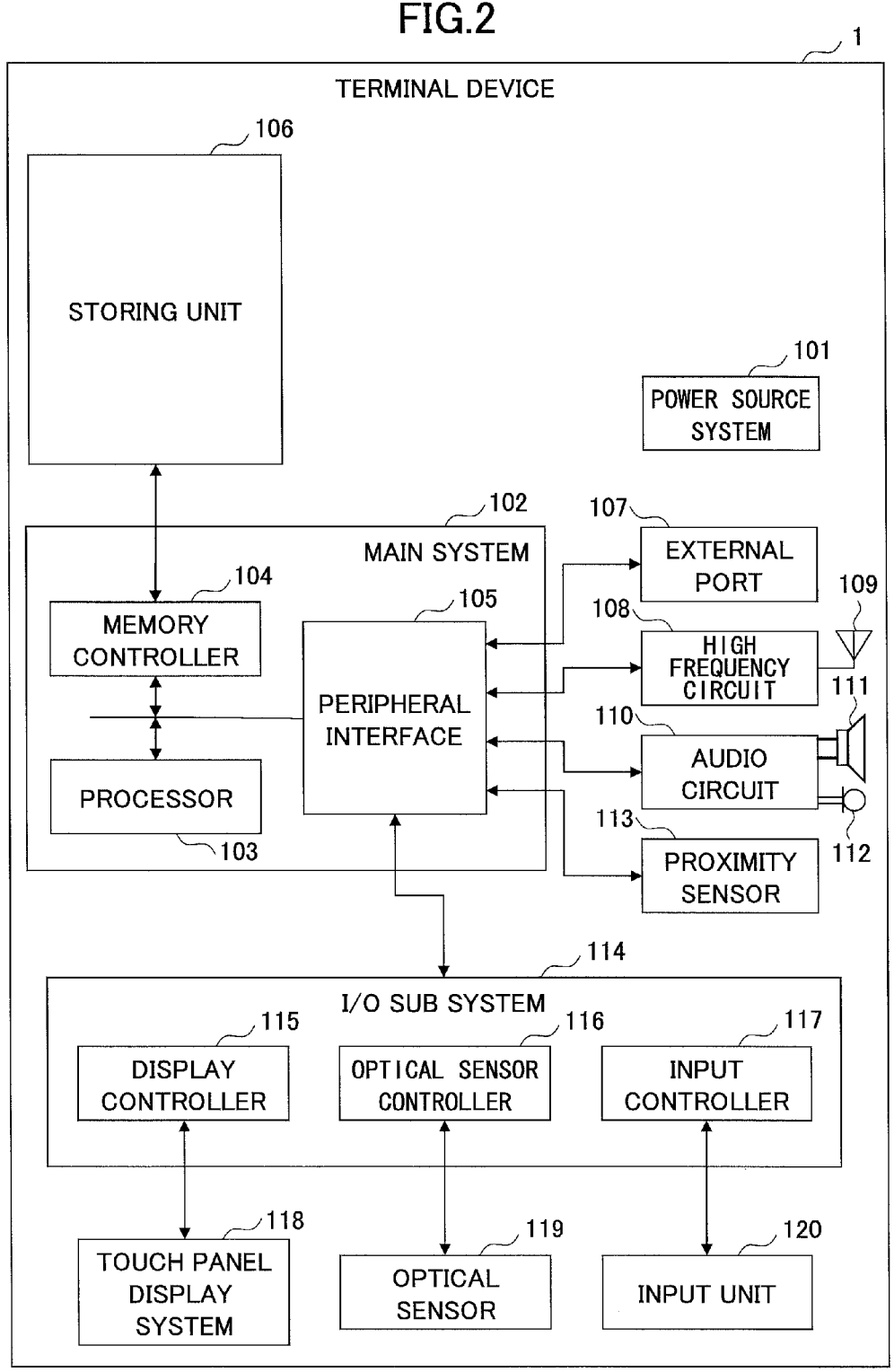
FIG. 2 is a block diagram illustrating an example of a hardware structure of a terminal device.

FIG. 2 is a block diagram illustrating an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118 (a touch type input unit), an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
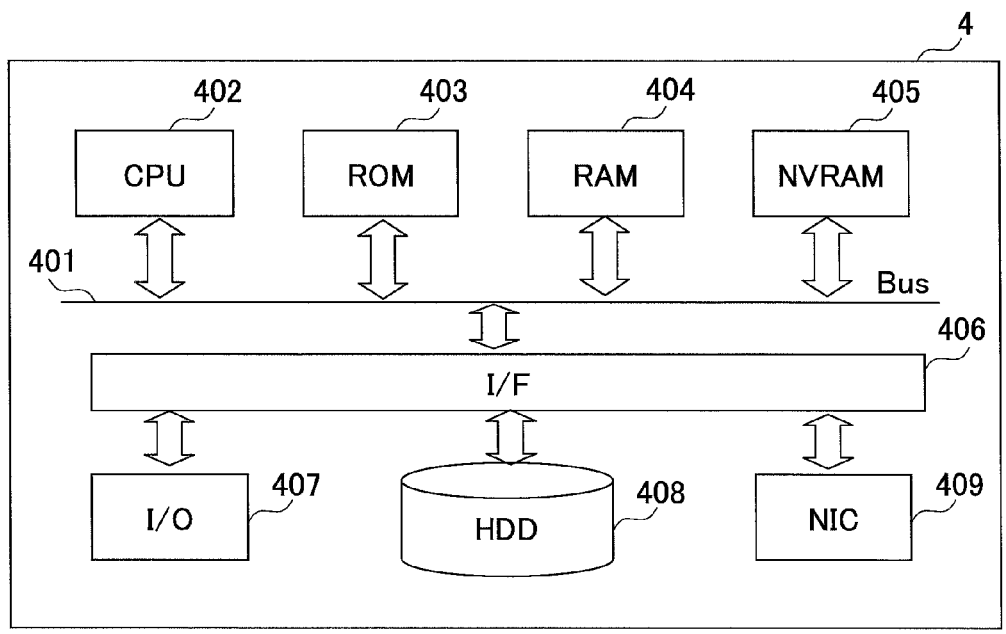
FIG. 3 is a block diagram illustrating an example of a hardware structure of a game processing server.

FIG. 3 is a block diagram illustrating an example of a hardware structure of the game processing server 4.

The game processing server 4 includes a Central Processing Unit (CPU) 402, a Read Only Memory (ROM) 403, a Random Access Memory (RAM) 404, a Non-Volatile Random Access Memory (NVRAM) 405 and an Interface (I/F) 406, which are connected to a system bus 401. The game processing server 4 further includes an Input/Output Device (I/O) 407 such as a keyboard, a mouse, a monitor, a Compact Disk/Digital Versatile Disk (CD/DVD) drive or the like, a Hard Disk Drive (HDD) 408 and a Network Interface Card (NIC) 409, which are connected to the I/F 406, or the like.

(Function)

Figure 4:
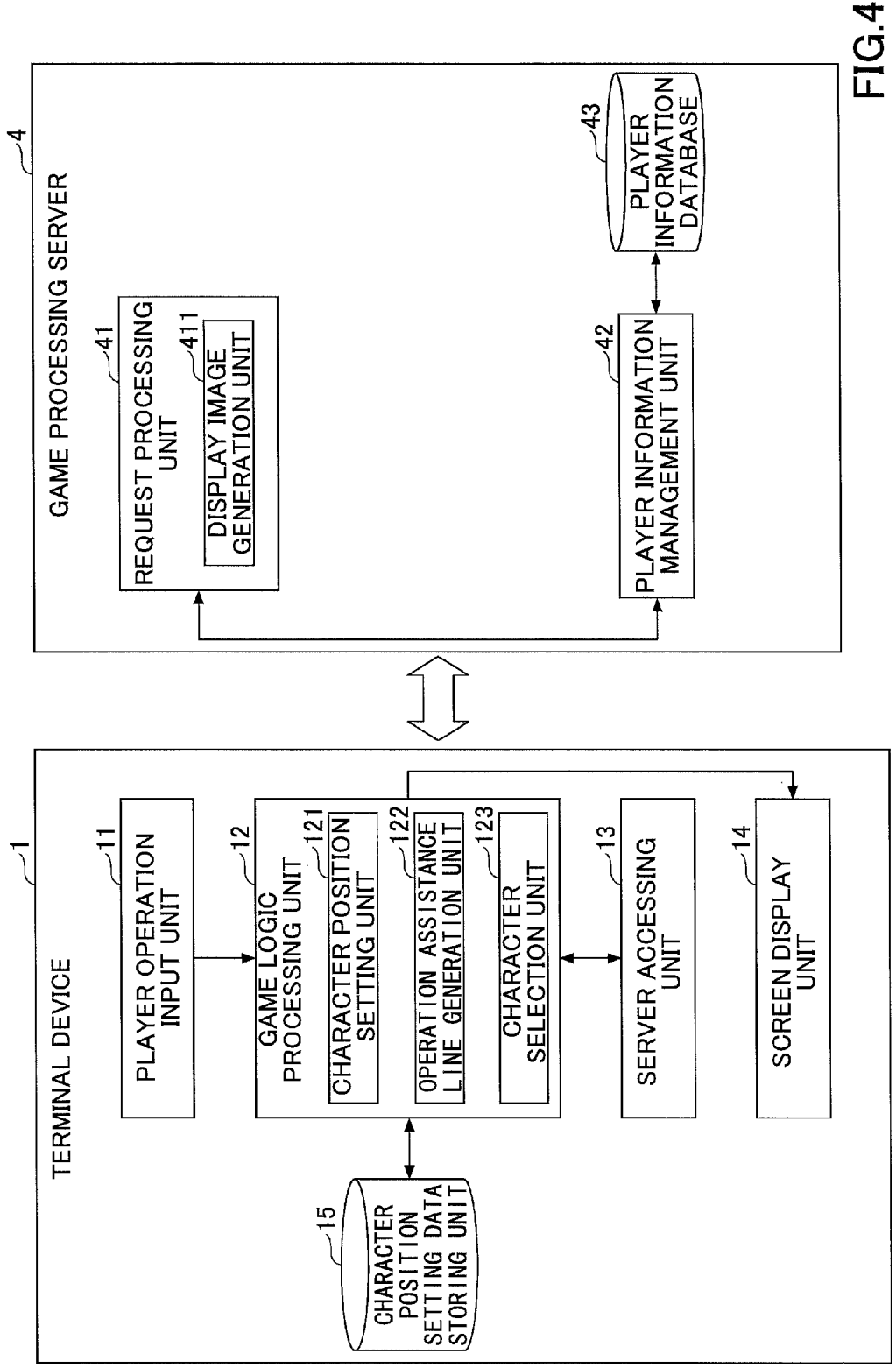
FIG. 4 is a block diagram illustrating an example of a functional structure of the terminal device and the game processing server of the embodiment.

FIG. 4 is a block diagram illustrating an example of a functional structure of the terminal device 1 and the game processing server 4 of the embodiment.

(Terminal Device 1)

The terminal device 1 includes a player operation input unit 11, a game logic processing unit 12, a server accessing unit 13, a screen display unit 14 and a character position setting data storing unit 15.

The player operation input unit 11 has a function to input (accept) an operation of a player that operates the terminal device 1. As the terminal device 1 (a smartphone, for example) of the embodiment includes the touch panel display system 118, as described above, a specific input operation such as tapping, swiping, flicking, pinching or the like may be input by the player.

The game logic processing unit 12 has a function to process a game by transitioning screens in accordance with an input operation of the player input by the player operation input unit 11. The game logic processing unit 12 may process the game logic based on an application that is previously downloaded and installed in the terminal device 1 (which is called application type). FIG. 4 illustrates a case of the application type. Alternatively, the game logic processing unit 12 may process the game logic based on page data described in a Hyper Text Markup Language (HTML) or the like and scripts or the like included in the page data sent from the game processing server apparatus 4 (which is called browser type).

The game logic processing unit 12 includes a character position setting unit 121, an operation assistance line generation unit 122 and a character selection unit 123.

In this embodiment, a predetermined plurality of character positioning areas are provided in advance for positioning a plurality of candidate characters to participate in a battle, respectively. Then, the player selects the plurality of candidate characters to participate in a battle, before starting the battle game. Thereafter, characters that actually participate in each battle are selected from the candidate characters positioned at the character positioning areas, respectively, by the player, after the battle game is started.

The character positioning areas may be a matrix including 3×3 boxes. At this time, 9 candidate characters, at the maximum, may be selected. Then, for example, 3 characters, at the maximum, may be selected to actually participate in a battle.

The character position setting unit 121 has a function to position and set the plurality of candidate characters, which are selected by the player, at the predetermined plurality of predetermined character positioning areas, respectively.

When the player is to select the characters that actually participate in each battle, the candidate characters positioned at the character positioning areas, respectively, are displayed on a screen of the screen display unit 14. Then, first, the player designates one of the candidate characters positioned at the character positioning areas, respectively. The candidate character designated by the player is referred to as a "designated character" hereinafter.

The operation assistance line generation unit 122 has a function to generate an operation assistance line that extends along the designated character and on at least one of the character positioning areas at which another candidate character is positioned. The operation assistance line generation unit 122 also has a function to display the generated operation assistance line on a screen of the screen display unit 14. The operation assistance line generation unit 122 generates a plurality of operation assistance lines when it is possible to draw a plurality of lines each extending along the designated character and on at least one of the character positioning areas at which another candidate character is positioned.

However, as will be explained later, the operation assistance line(s) may not be displayed in an alternative example.

After designating one of the candidate characters, the player designates a direction from the designated character having the designated character as a base point. When the operation assistance line(s) are displayed, the player may follow one of the operation assistance line(s) to designate the direction. The direction designated by the player is referred to as a "designated direction" hereinafter.

The character selection unit 123 has a function to select the designated character and one or more candidate characters positioned at the character positioning areas that are on a line extending along the designated character in the designated direction, respectively. The combination of the designated character and the one or more candidate characters as selected above are referred to as a "selected combination of characters to actually participate in the battle". Here, the "character positioning areas that are on a line extending along the designated character in the designated direction" may include the character positioning areas that are on a line extending along the designated character in a vicinity direction that is in the vicinity of the designated direction.

The candidate characters selected as the selected combination of characters to actually participate in the battle (a plurality of characters) become members of a team that participate in the battle.

The server accessing unit 13 has a function to send a request to the game processing server 4 and receive a processed result or the like as a response from the game processing server 4 when it is necessary to access the game processing server 4 in a course of the processing by the game logic processing unit 12.

The screen display unit 14 has a function to display screens of the terminal device 1 under control of the game logic processing unit 12.

The character position setting data storing unit 15 has a function to store data used for character positioning or data used for generating operation assistance lines. The character position setting data storing unit 15 stores the predetermined plurality of character positioning areas, such as a matrix, for example.

(Game Processing Server 4)

The game processing server 4 includes a request processing unit 41, a player information management unit 42 and a player information database 43.

The request processing unit 41 has a function to receive a request from the terminal device 1, process a corresponding process and send a processed result of the request to the terminal device 1 as a response.

The request processing unit 41 includes a display image generation unit 411. The display image generation unit 411 generates various image data to be displayed at the terminal device 1.

Here, the response by the request processing unit 41 may include screen information that is to be operated by the player next, in addition to the required processed result, for the browser type.

The player information database 43 stores various information of all of the players participating in the battle game. The player information management unit 42 has a function to manage the various information stored in the player information database 43. Specifically, the player information management unit 42 has a function to refer to and update the player information stored in the player information database 43 in response to the request from the request processing unit 41. An example of a data structure of the player information is explained later.

These functional units as described above are actualized by computer programs executed on hardware resources such as the CPU, the ROM, the RAM or the like of the computers composing the apparatuses, respectively. Here, these functional units may be referred to as "means", "modules", "units" or "circuits".

The functional units of the game processing server 1 may be provided in a single computer. Alternatively, the functional units of the game processing server 1 may not be provided in a single computer and may be distributed in a plurality of computers, if necessary. Further, for example, databases or the like may systematically store predetermined data on a recording medium such as a HDD or the like in a server computer. However, the databases may not be necessarily provided in the server computer and may be provided in another computer.

(Player Information Database)

FIG. 5A and FIG. 5B are respective views illustrating an example of a data structure of the player information of the embodiment. The player information is stored in the player information database 43.

Here, FIG. 5A is a view illustrating an example of a basic table of the player information. The basic table of the player information includes items (fields) such as "player ID", "player name, "status" and the like. FIG. 5B is a view illustrating an example of a possessing character table of the player information. The possessing character table of the player information includes items (fields) such as "player ID", "possessing character ID", "character name", "character image", "character strength" and the like.

In the basic table of the player information illustrated in FIG. 5A, the "player ID" is data to specify (identify) the player. The "player name" is data for a display name of the player. The "status" is data expressing a progression degree of the game.

In the possessing character table of the player information illustrated in FIG. 5B, the "player ID" corresponds to the "player ID" illustrated in FIG. 5A and is data to specify the player who possesses the respective character.

The "possessing character ID" expresses ID of the friend character possessed by the respective player. The battle game of the embodiment relates to a team battle in which the battle is performed by teams (three friend characters versus x enemy characters, for example). Thus, the player is capable of possessing a plurality of friend characters by increasing friends in a game story, adding friend character cards or the like.

The "character name" is data for a display name of the character. The "character image" is data (file) for displaying the character.

The "character strength" is data expressing an ability (a game effect) of the character in the game. For example, the "character strength" includes parameters such as level, HP (hit point), MP (magic point), offence, defense and the like. As the characters have different abilities as such, the player can strategically enjoy the battle game having diversity by selecting the friend characters having various abilities to participate in each battle.

The player information illustrated in FIG. 5A and FIG. 5B is just an example. The player information may include items such as "possessing item", "armed item" or the like.

(Character Position Setting Data)

FIG. 6A is a view illustrating an example of the predetermined character positioning areas at which candidate characters to participate in a battle are positioned, before the battle game is started. The character positioning areas may be referred to as a "character board" or the like.

The character positioning areas exemplified here is a matrix including a predetermined number of boxes in a column direction and a predetermined number of boxes in a row direction. Specifically, the matrix includes 3×3 boxes. The boxes of the matrix are respectively provided with identifiers (1-a, 2-a, . . . , for example) for specifying each of the boxes. It is possible to position a single candidate character at each of the boxes of the matrix. Thus, in this example, 9 candidate characters, at the maximum, can be positioned when all of the boxes of the matrix are used.

In this embodiment, the player selects candidate characters from characters included in a possessing character list. Then, the player positions the selected characters at the boxes of the matrix, respectively, before starting the battle game. The candidate characters positioned at the character positioning areas are candidates of the character capable of actually participating in the battle. For example, three of the candidate characters actually participate in the battle.

In other words, according to the embodiment, the player selects in advance and positions candidate characters to be participated in the battle at the character positioning areas, respectively, before starting the battle game. Then, when an actual battle is started by meeting an enemy character, for example, the player selects characters (three, for example) to actually participate in the battle from the candidate characters positioned at the character positioning areas for each of the battles (or each of turns).

FIG. 6B is a view illustrating an example of a table for storing the candidate characters positioned at the character positioning areas, respectively, to participate in a battle. For example, the table includes items (fields) such as "box in matrix", "positioned character ID", "selectable combination" and the like.

The "box in matrix" corresponds to the identifier provided to the boxes of the matrix for specifying the positions of the characters positioned at the boxes of the matrix, respectively.

The "positioned character ID" indicates character ID of a candidate character positioned at the respective box of the matrix.

When the player selects one of the characters as the candidate character to be positioned at one of the boxes of the matrix, the character ID of the selected character is stored in association with the identifier of the respective box. FIG. 6B illustrates a status where the characters are not positioned at the boxes of the matrix yet. Thus, "positioned character ID" are empty.

In this embodiment, as described above, when an actual battle is started, a plurality of characters to actually participate in the battle (or a battle turn) are selected by the player from the candidate characters positioned at the character positioning areas.

The "selectable combination" indicates a combination of selectable character positioning areas when the candidate character positioned at the respective "box in matrix" is designated as the combination of characters to actually participate in the battle.

In the "selectable combination", combinations of the boxes positioned on lines extending in upper/lower, left/right and oblique directions from the respective box are defined as the selectable combinations for the members to participate in the battle. For example, for the box provided with identifier "1-a", combinations of the boxes such as "1-a/2-a/3-a", which are on a line extending in a right direction from the respective box, "1-a/1-b/1-c", which are on a line extending in a lower direction from the respective box, and "1-a/2-b/3-c", which are on a line extending in an oblique direction from the respective box are defined.

As such, according to the present embodiment, when an actual battle is started, a plurality of characters to actually participate in the battle (or a battle turn) are selected by the player from the candidate characters positioned at the character positioning areas, respectively, as described above.

Here, according to a game rule, a limitation is provided in selecting the characters to actually participate in the battle (or a battle turn) in this embodiment. That is, only the combination of the candidate characters positioned at the combination of the boxes of the matrix defined in the "selectable combination" can be selectable.

(Example of Selecting Character)
(Character Positioning)

Figure 7:
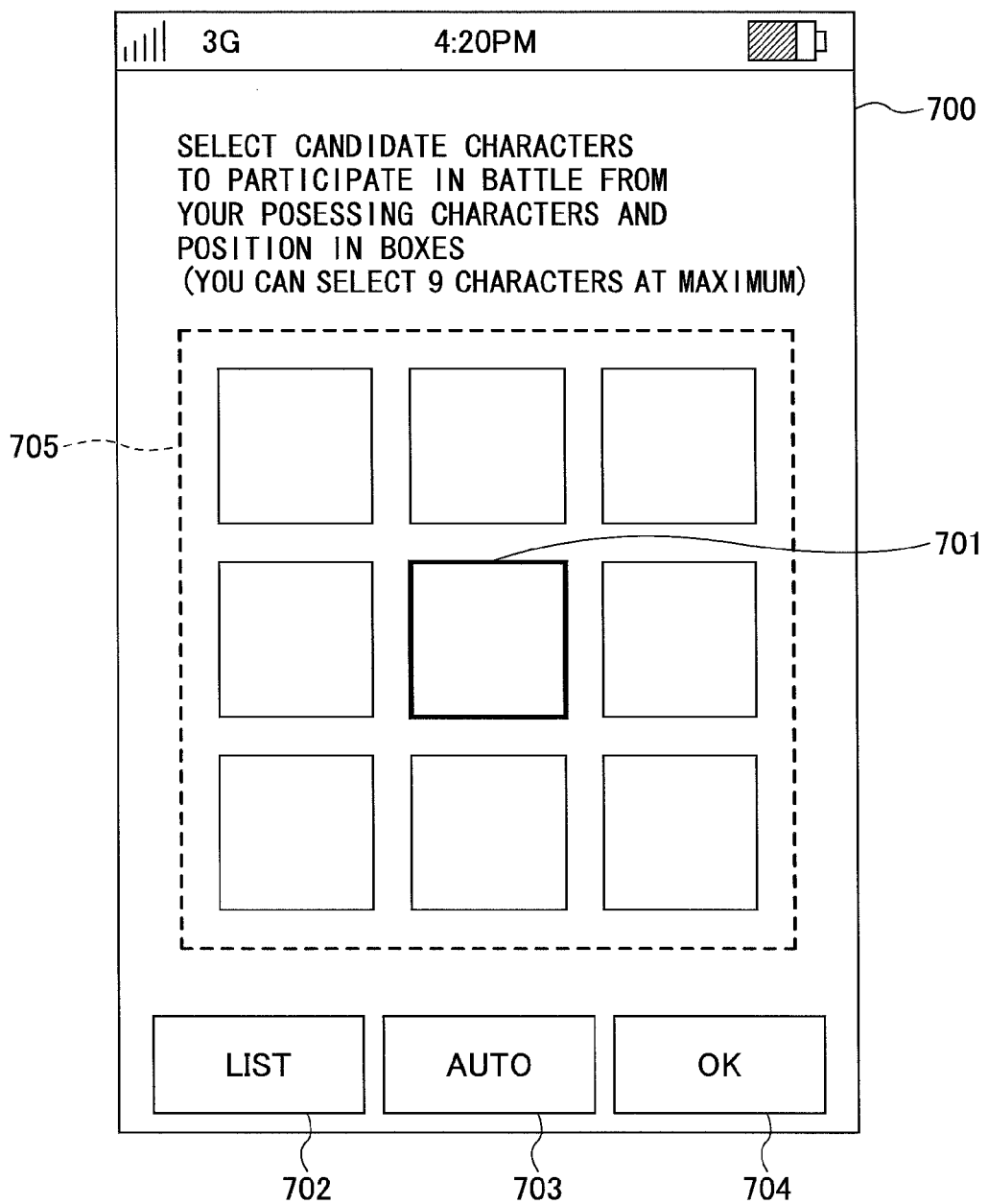
FIG. 7 is a view illustrating an example of a character positioning screen.

FIG. 7 is a view illustrating an example of a character positioning screen 700 displayed on the screen display unit 14 of the terminal device 1.

The character positioning screen 700 includes a character board 705, a "LIST" button 702 for displaying the possessing character list, an "AUTO button 703 and an "OK" button 704.

Prior to starting the battle game, the player selects candidate characters from the characters included in the possessing character list and positions the characters at boxes of the character board 705, respectively. The character board 705 corresponds to the character positioning areas (matrix), as illustrated in FIG. 6A.

Specifically, the player selects (taps, for example) one of the boxes (701, for example) of the character board 705 in the character positioning screen 700 at which a candidate character is to be positioned. Subsequently, the player taps the "LIST" button 702.

Figure 8:
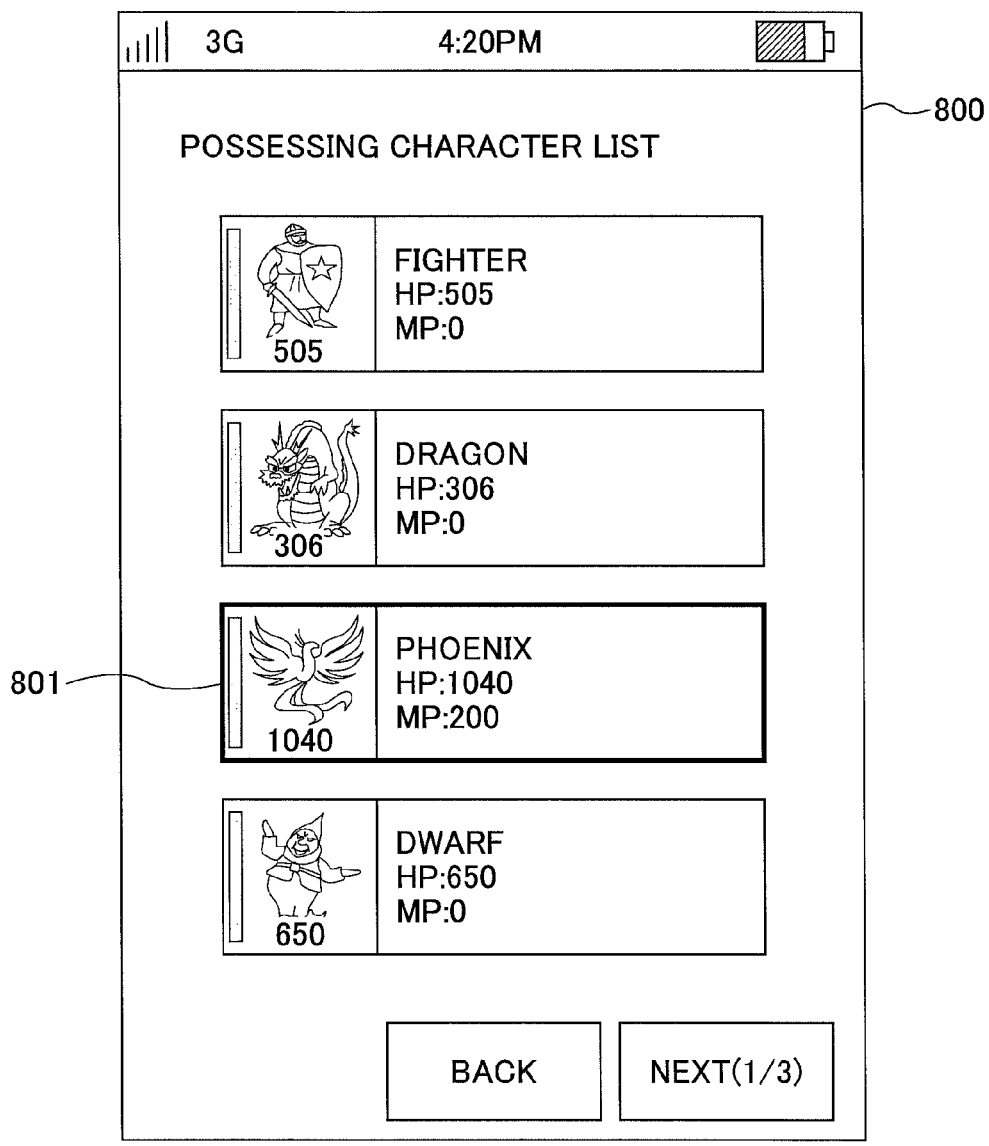
FIG. 8 is a view illustrating an example of a possessing character list.

FIG. 8 is a view illustrating an example of a possessing character list 800.

When the "LIST" button 702 in the character positioning screen 700 illustrated in FIG. 7 is selected, the possessing character list 800 is displayed. The player selects one of the characters (801, for example) to be positioned at the selected box 701, from the possessing character list 800.

Figure 9:
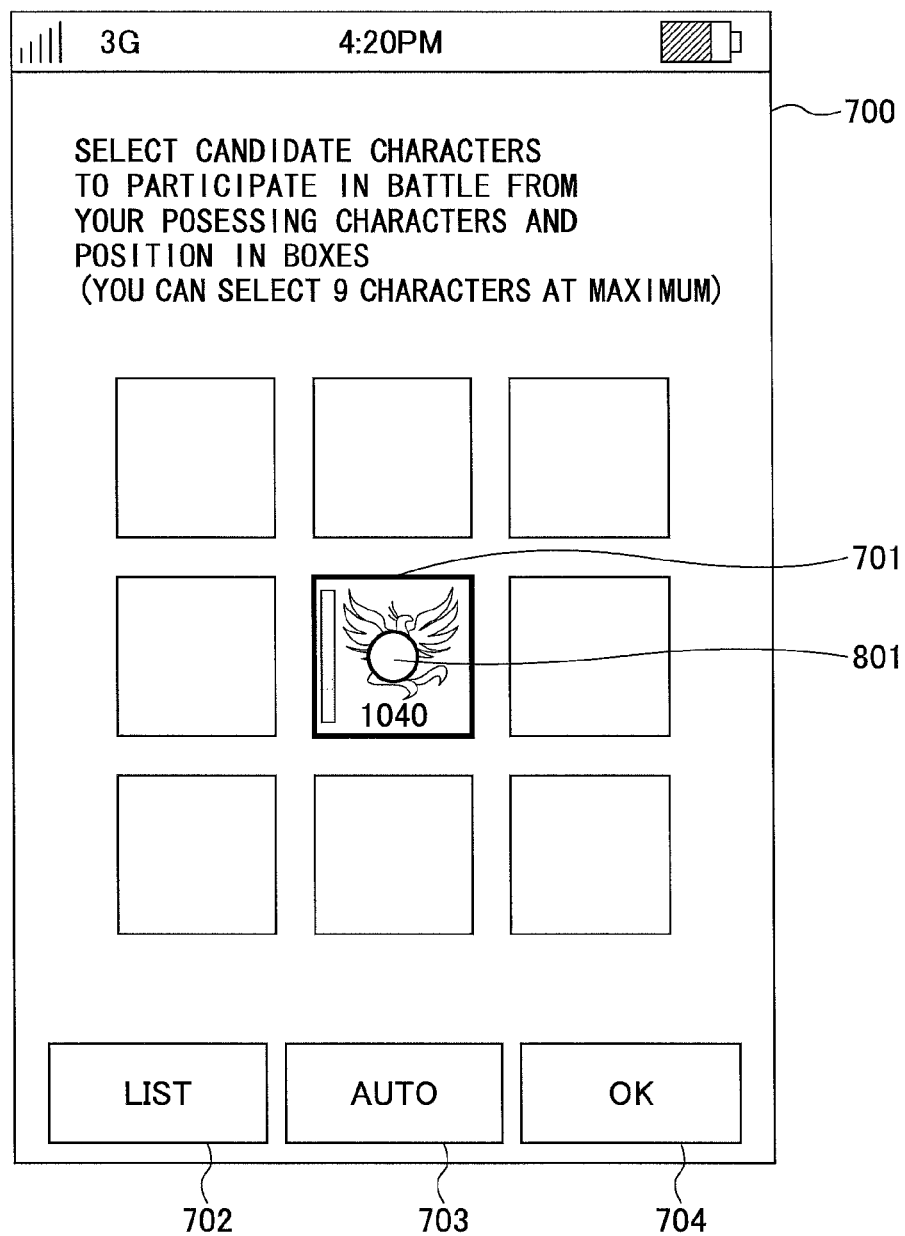
FIG. 9 is a view illustrating another example of the character positioning screen.

FIG. 9 is a view illustrating another example of the character positioning screen 700.

When the character 801 in the possessing character list 800 illustrated in FIG. 8 is selected, the character positioning screen 700 is displayed again. As illustrated in FIG. 9, an image of the character 801 is displayed in the box 701.

Figure 10:
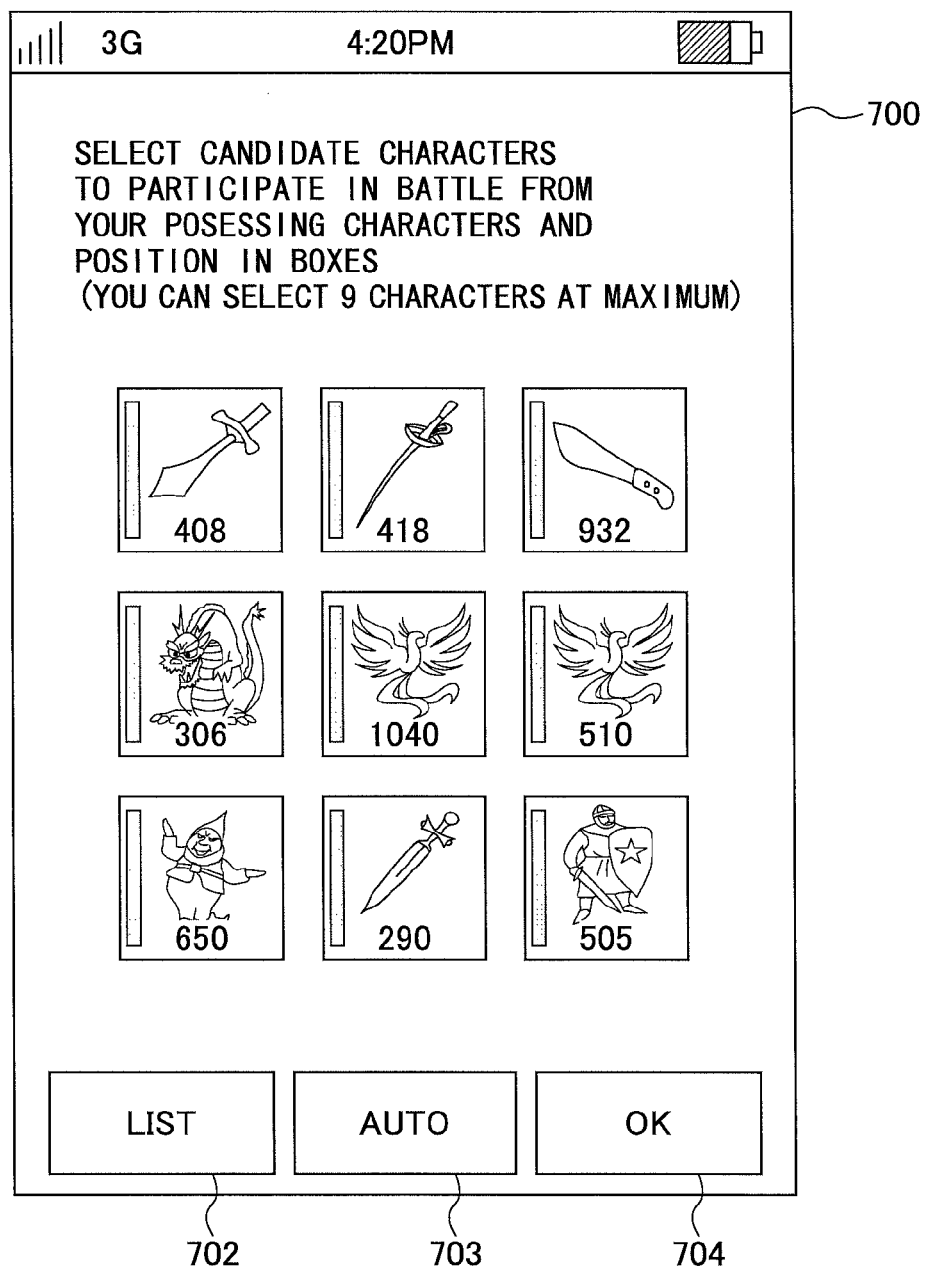
FIG. 10 is a view illustrating another example of the character positioning screen.

FIG. 10 is a view illustrating another example of the character positioning screen 700.

Similarly, the player repeats an operation of positioning a character at a box of the character board 705 in the character positioning screen 700. As a result, as illustrated in FIG. 10, nine characters, at the maximum, can be positioned at nine boxes of the character board 705, respectively. When the player completes the operation of character positioning, the player selects (taps) the "OK" button 704.

When the player selects (taps) the "AUTO" button 703, nine characters selected from the possessing character list may be automatically positioned at the nine boxes of the character board 705.

Further, the operation of character positioning is not limited to the above described example. For example, one of the characters may be selected from the "possessing character list" illustrated in FIG. 8, first, and then the box at which the character is to be positioned may be selected as illustrated in FIG. 7. In this case as well, as a result, an image of the character 801 is positioned (displayed) at the box 701 as illustrated in FIG. 9.

(Character Selection)

Figure 11:
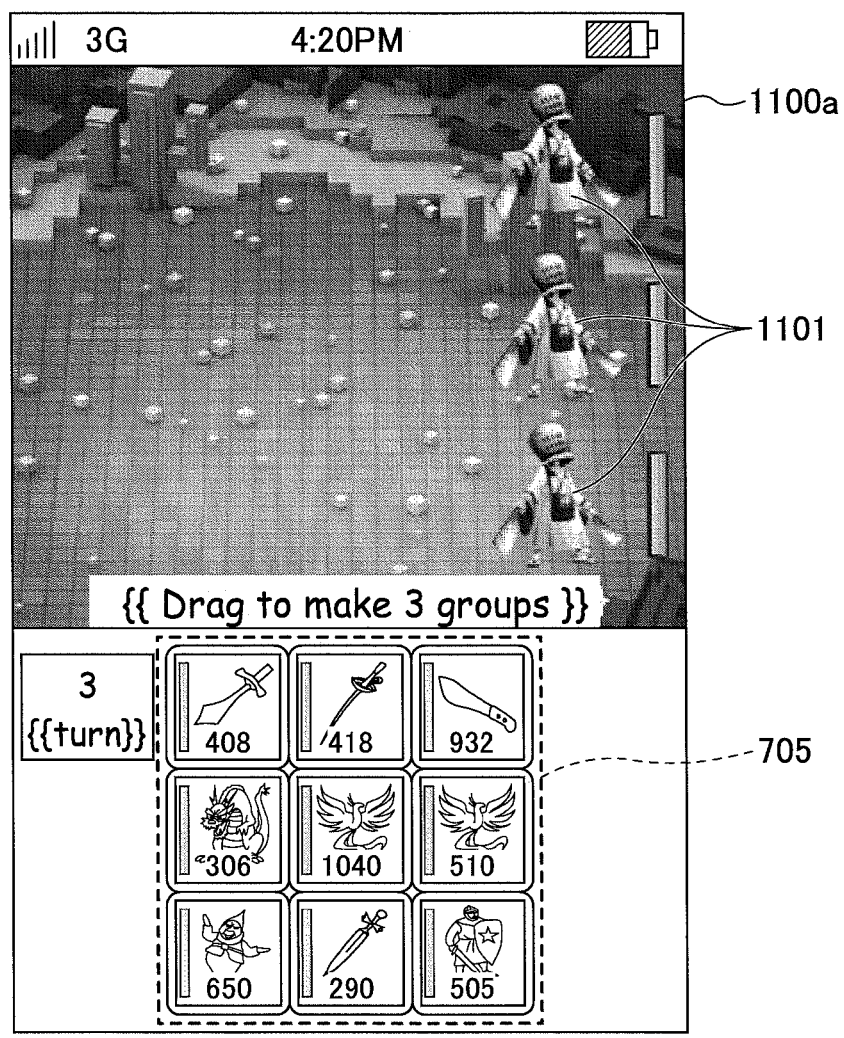
FIG. 11 is a view illustrating an example of a character selection screen.

FIG. 11 is a view illustrating an example of a character selection screen 1100a.

When the player completes the operation of character positioning, the player actually starts the battle game. The character selection screen 1100a illustrated in FIG. 11 includes a battle scene that is started when the player meets enemies 1101 in the battle game.

In the character selection screen 1100, the character board 705 at which candidate characters are positioned is also displayed. The candidate characters positioned at the character board 705 are selected in advance by the player, as described above.

Then, the player selects three characters, which actually participate in the battle, from the nine candidate characters positioned at the character board 705.

Figure 12:
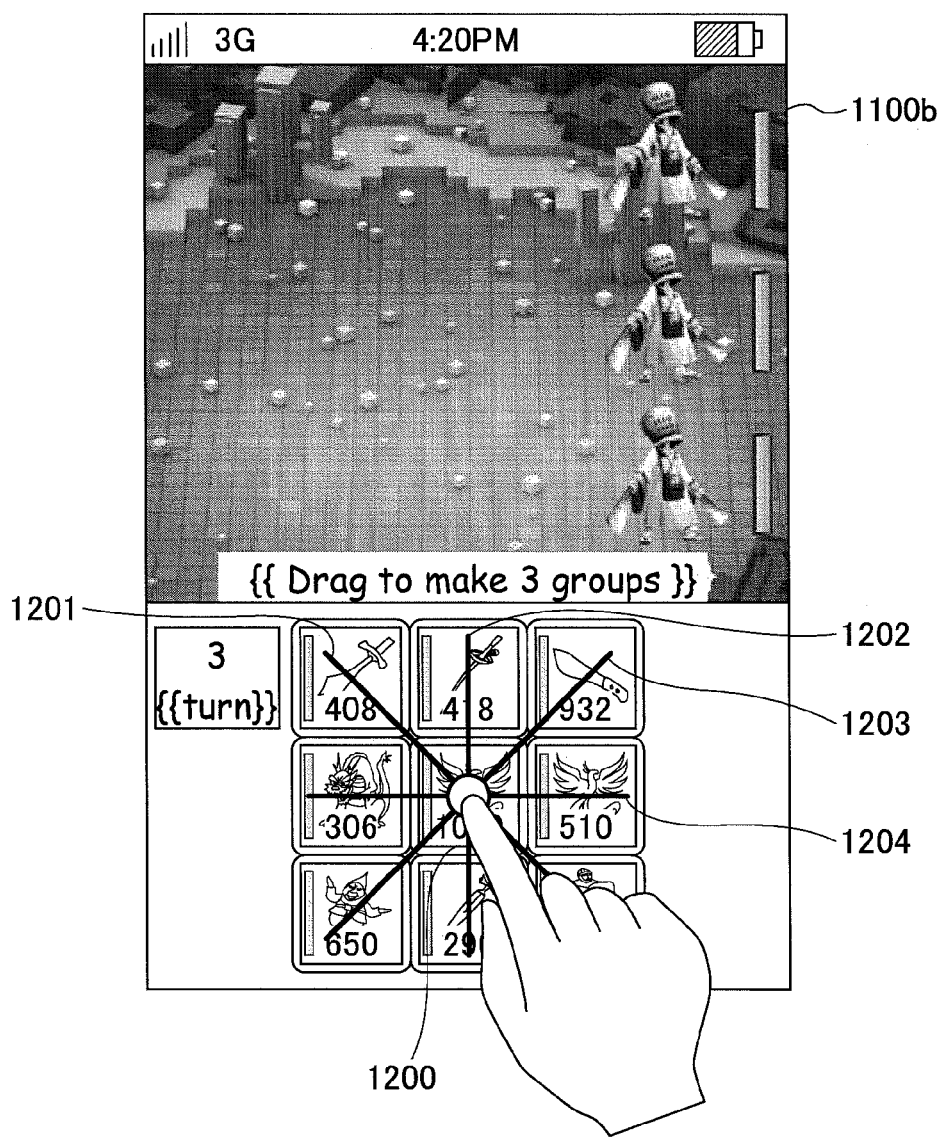
FIG. 12 is a view illustrating an example of another character selection screen.

FIG. 12 is a view illustrating an example of another character selection screen 1100b.

When selecting three characters to actually participate in the battle, as illustrated in FIG. 12, first, the player designates one of the candidate characters (one of the boxes, 1200) by a tapping operation, for example. At this time, four operation assistance lines 1201 to 1204, each extends on the designated box 1200, are displayed.

Figure 13:
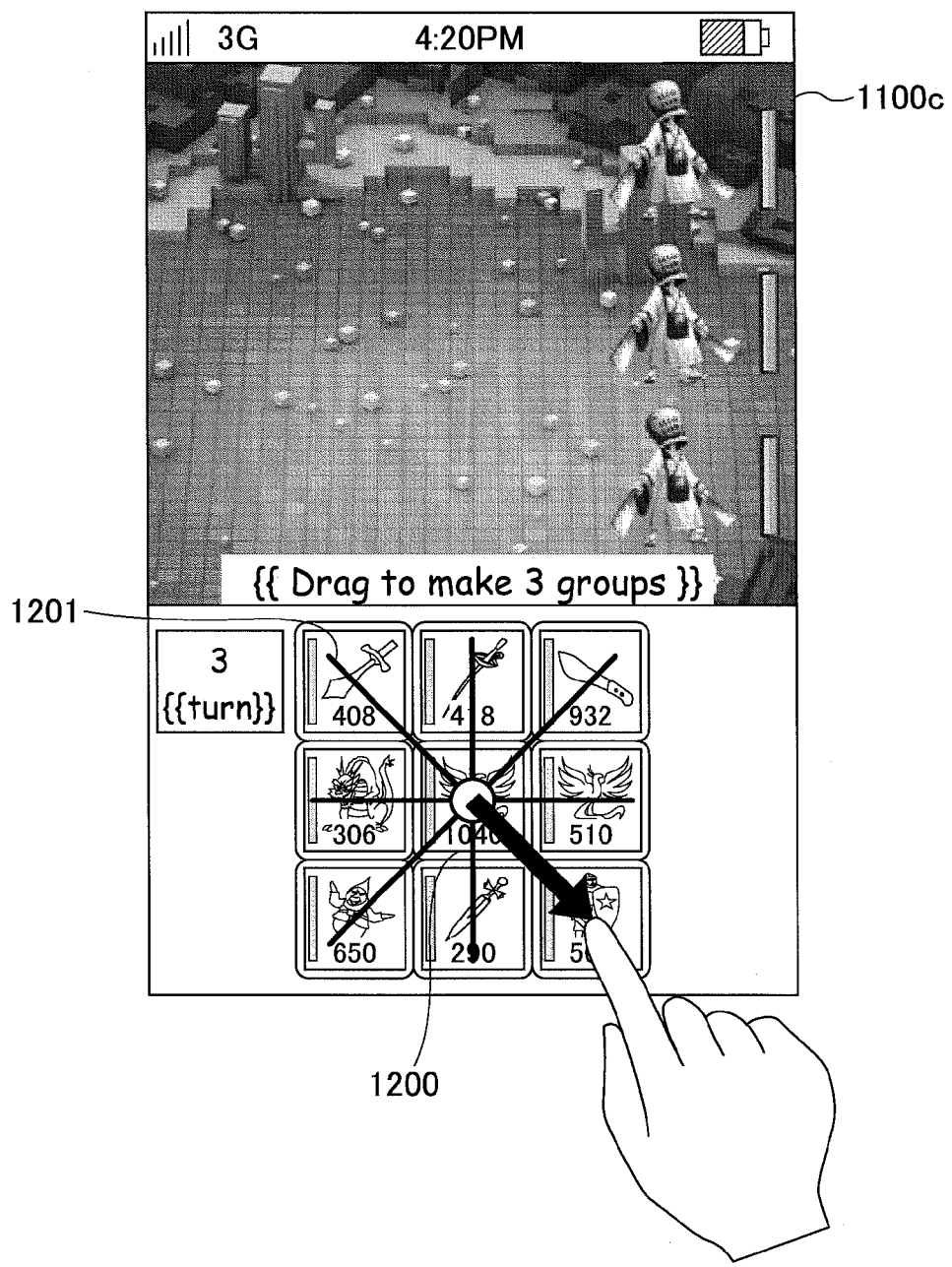
FIG. 13 is a view illustrating an example of another character selection screen.

FIG. 13 is a view illustrating an example of another character selection screen 1100c.

As illustrated in FIG. 13, the player designates one of the operation assistance lines 1201 to 1204. As the operation assistance lines 1201 to 1204 are displayed, guided by the operation assistance lines 1201 to 1204, the player swipes or flicks, for example, along one of the operation assistance lines 1201 to 1204 from the designated box 1200.

Here, it is exemplified that the player swipes in a right and lower oblique direction along the operation assistance line 1201. With this operation, the assistance line 1201 is designated. Here, the operation assistance line 1201 is designated when the player swipes the part of the operation assistance line 1201 along the direction in which the operation assistance line 1201 extends. Thus, the operation assistance line 1201 is designated when the player swipes the operation assistance line 1201 in a left and upper oblique direction from the box 1200.

Figure 14:
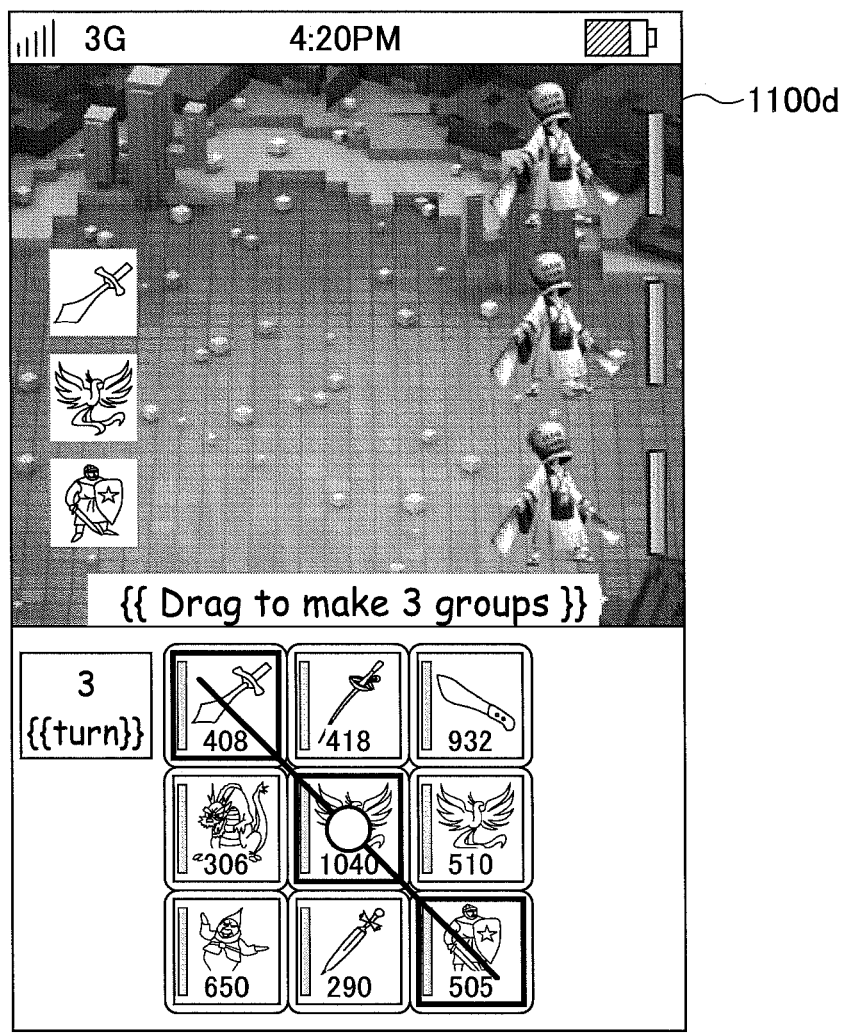
FIG. 14 is a view illustrating an example of another character selection screen.

FIG. 14 is a view illustrating an example of another character selection screen 1100d.

As illustrated in FIG. 14, by the above described operation, the candidate characters positioned on the operation assistance line 1201 are selected. That is, the candidate characters positioned on the operation assistance line 1201 are selected as the selected combination of characters to actually participate in the battle. The selected combination of characters includes the candidate character that is designated by the player first.

Generally, when selecting three characters that actually participate in the battle, the player independently selects each of the three characters from characters included in the possessing character list, for example. Thus, it takes a time for the player to select the three characters. However, according the present embodiment, the player is to only designate one of the candidate characters positioned at the character board 705 and designate a direction along one of the displayed operation assistance lines for selecting three characters to actually participate in the battle. With this operation, a plurality of the characters positioned on the selected operation assistance line, including the designated one of the candidate characters, are selected.

Thus, the player can quickly select the plurality of characters. More specifically, the player is only to perform a series of simple operations of tapping and swiping. Further, as a plurality of operation assistance lines extending along the designated character as a base point in multiple directions are displayed, the player can intuitively determine the selectable characters.

Further, according to the game rule, the selectable characters are limited to the candidate characters that are positioned on one of the operation assistance lines extending from the designated character having the designated character as the base point. As the characters have different abilities as described above, it is necessary for the player to strategically position the characters at the character board 705 by considering the abilities of the characters. Thus, interesting in the game is further increased.

As a specific strategy, a character having the strongest ability may be positioned at a center box of the matrix of the character board 705 and characters each having the next strongest ability may be positioned at the corner boxes of the matrix of the character board 705, for example. With this strategy, the character positioned at the center box has the highest chance to participate in the battle because the character can be selected in combinations of boxes aligned on operation assistance lines extending in the vertical direction, lateral direction, and oblique directions.

Figure 15:
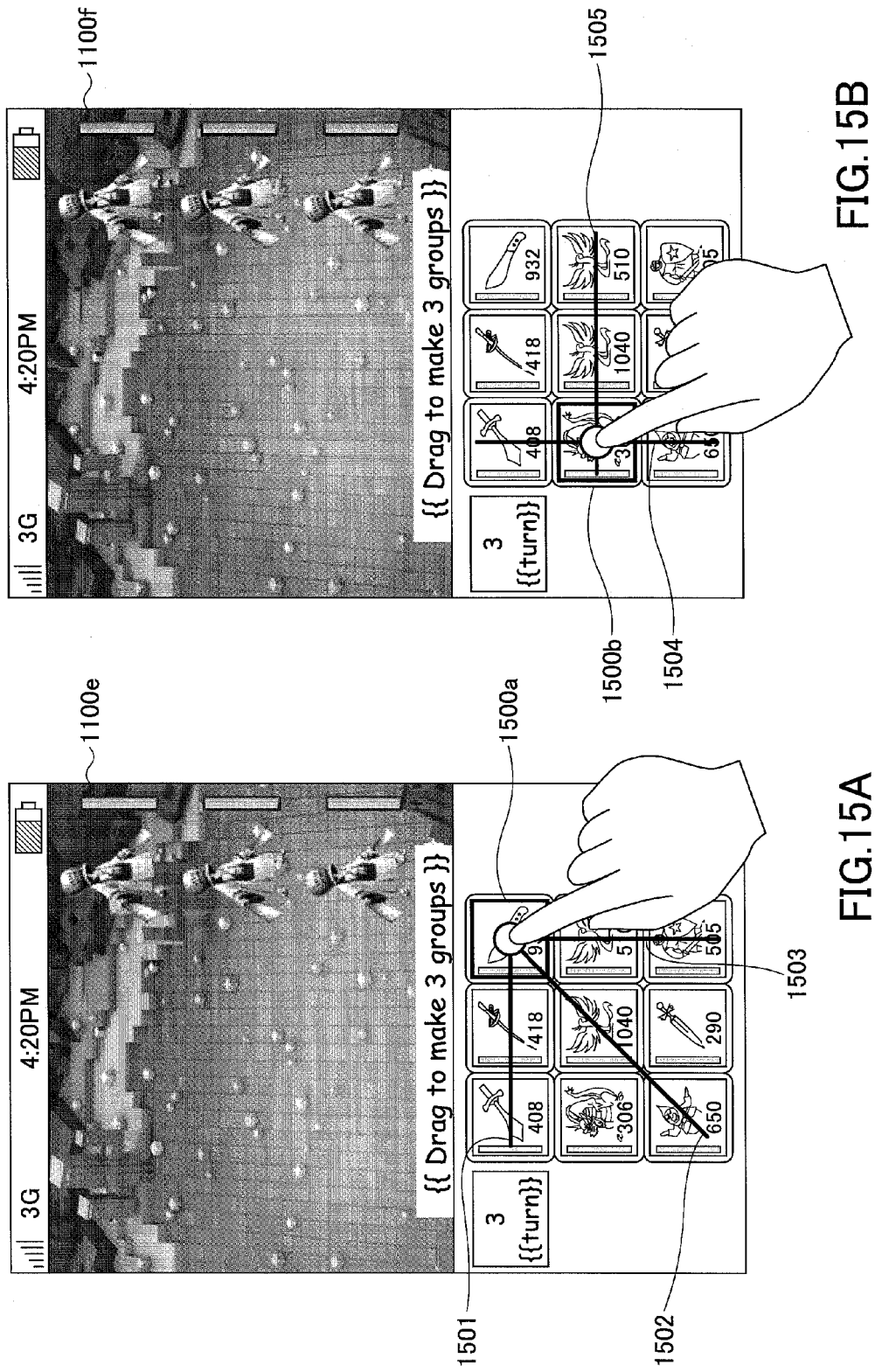
FIG. 15A and FIG. 15B are views illustrating an example of character selection screens, respectively.

FIG. 15A and FIG. 15B are views illustrating an example of character selection screens 1100e and 1100f, respectively.

Similar to the above described method, when selecting three characters to participate in the battle, first, the player designates (taps) one of the candidate character to actually participate in the battle.

For the case illustrated in FIG. 15A, operation assistance lines 1501 to 1503 (three in total) each extending along a designated box 1500*a* as the base point are displayed. For the case illustrated in FIG. 15B, operation assistance lines 1504 and 1505 (two in total) each extending along a designated box 1500*b* as the base point are displayed. Subsequently, the player can select the three characters to actually participate in the battle by performing an operating (swiping or flicking, for example) along one of the displayed operation assistance lines.

Here, when selecting three characters to participate in the battle, a plurality of groups of characters may be selected in one selection phase (three groups for each turn, for example). At this time, as well, the player is only to perform a series of simple operations of tapping and swiping for selecting the three characters for each of the groups. Further, the player is capable of selecting the same character multiple times in different groups. Thus, it is possible for the player to have the stronger character participate in successive battles. Thus, it is necessary for the player to strategically select the characters and the quality of the game is further increased.

When one of the candidate characters is designated by the player, the operation assistance line generation unit 122 generates operation assistance lines extending along the designated character having the designated character as the base point toward directions of the character positioning areas (boxes, for example) at which other characters are positioned. In this embodiment, as described above, a matrix having 3×3 boxes is used for the character positioning areas to position candidate characters. Thus, lines extending in a vertical direction, a lateral direction and/or oblique (diagonal) directions are necessarily generated as the operation assistance lines.

However, the character positioning areas are not limited to regularly and orderly aligned areas such as the matrix having 3×3 boxes. For example, the character positioning areas may be randomly placed areas. At this time, a line extending along the designated character having the designated character as the base point and extending in a direction among 360 degree may be used as an operation assistance line.

Further, as described above, the characters on the designated operation assistance line are selected as the selected combination of characters to actually participate in the battle. However, the number of characters that are selected may vary in accordance with the positions of the candidate characters. Especially, when the character positioning areas are randomly placed areas, the number of candidate characters positioned on each of the operation assistance lines varies and thus the number of characters that are selected may vary.

Further, according to the present embodiment, the operation assistance lines may not be displayed. The operation assistance lines are displayed in order to assist the operation of the player. Thus, for example, when the player is used to playing the battle game, the player may set "not to display the operation assistance lines", for example, so that the operation assistance lines are not displayed.

At this time, the player may select three characters to actually participate in the battle by, first, tapping one of the candidate characters to designate, and then performing an operation (swiping or flicking, for example) in a vertical direction, a lateral direction and/or oblique (diagonal) directions from the designated character having the designated character as the base point, without using the operation assistance lines.

(Operation)

Figure 16:
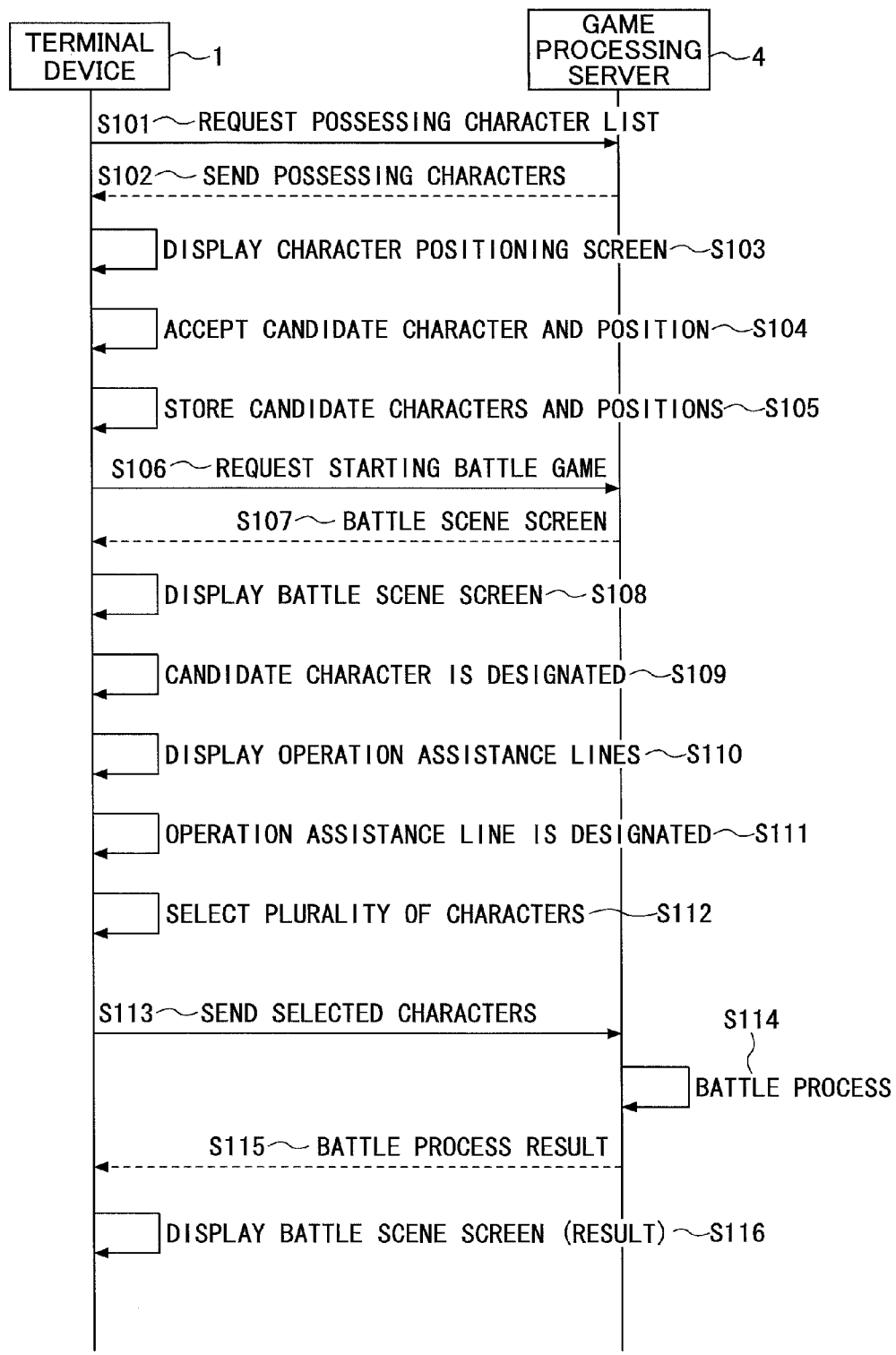
FIG. 16 is a sequence diagram illustrating an example of an operation of the embodiment for an application type.

FIG. 16 is a sequence diagram illustrating an example of an operation of the embodiment for the application type.

When the player requests a character positioning screen (see FIG. 7, for example) for character positioning, under control of the character position setting unit 121 of the game logic processing unit 12, the server accessing unit 13 sends a request to send a possessing character list with player ID to the game processing server 4 (step S101).

Upon accepting the request to send the possessing character list, the request processing unit 41 of the game processing server 4 obtains information about possessing characters from the player information database 43 (see FIG. 5B, for example) via the player information management unit 42 using the player ID accepted with the request as a key. Then, the request processing unit 41 of the game processing server 4 sends the obtained information about possessing characters to the terminal device 1 (step S102).

Then, the screen display unit 14 of the terminal device 1 displays the character positioning screen (step S103). Specifically, the screen display unit 14 of the terminal device 1 displays the character positioning screen 700 as illustrated in FIG. 7.

At the terminal device 1, when a candidate character and its position at the character positioning areas are input by the player (see FIG. 7 and FIG. 8, for example), the player operation input unit 11 accepts the information (step S104).

The character position setting unit 121 of the terminal device 1 stores the input candidate character in association with the input position at the character positioning areas, (see FIG. 9 and FIG. 10, for example) (step S105). Specifically, with reference to FIG. 6B, for example, the character position setting unit 121 stores character ID of the input candidate character in the "positioned character ID" in association with the respective identifier of the input position (box) in the "box in matrix" of the table stored in the character position setting data storing unit 15. The processes of steps S104 and S105 are repeated until the candidate characters are selected for all of the boxes of the matrix, all of the possessing characters are selected, or the like.

Thereafter, when the player operates the terminal device 1 to start the battle game, under control of the game logic processing unit 12, the server accessing unit 13 sends a request to start the battle game with player ID to the game processing server 4 (step S106). At this time, the server accessing unit 13 may send information relating to the candidate characters and their positions, in association with each other (the table illustrated in FIG. 6B, for example), to the game processing server 4 side.

At the game processing server 4, the display image generation unit 411 of the request processing unit 41 generates various scenes in accordance with progressions of the battle game and sends the generated scenes to the terminal device 1. Further, when a battle is started, the display image generation unit 411 of the request processing unit 41 generates a battle scene screen and sends it to the terminal device 1 (step S107).

Alternatively, for the application type, the function of the terminal device 1 side, and the various scenes including the battle scene screen may be generated as the terminal device 1 side.

The screen display unit 14 of the terminal device 1 displays the battle scene screen (step S108). The battle scene screen includes the character board 107 in which the characters are positioned. Specifically, the screen display unit 14 displays the character selection screen 1100*a* as illustrated in FIG. 11.

At the terminal device 1, when one of the candidate characters in the character board 107 is designated by the player (see FIG. 12, for example), the player operation input unit 11 accepts the information (step S109).

When the designation of the one of the candidate characters is accepted, the operation assistance line generation unit 122 of the terminal device 1 generates operation assistance lines that extends along the designated character as the base point toward directions in which the character positioning areas (the boxes of the matrix) where other characters are positioned, and displays the generated operation assistance lines on the screen of the screen display unit 14 (step S110). Specifically, the operation assistance line generation unit 122 displays the character selection screen 1100b as illustrated in FIG. 12.

At this time, the operation assistance line generation unit 122 may refer to the table for storing the candidate characters positioned at the character positioning areas, respectively, as illustrated in FIG. 6B, stored in the character position setting data storing unit 15. Then, the operation assistance line generation unit 122 may generate operation assistance lines that pass the boxes defined in the "selectable combination" corresponding to the identifier of the box of the designated character in the "box in matrix" based on the data of the "selectable combination" (see FIG. 6B, for example).

At the terminal device 1, when one of the operation assistance lines is designated by the player (see FIG. 13, for example), the player operation input unit 11 accepts the information (step S111).

When one of the candidate characters is designated and one of the operation assistance lines (direction information from the designated character as the base point) is designated, the character selection unit 123 of the terminal device 1 selects the characters (including the designated character) positioned at the character positioning areas (boxes of the matrix, for example) on the designated operation assistance line (on the line or in the vicinity of the line) as the combination of characters to actually participate in the battle (step S112) (see FIG. 13 and FIG. 14, for example).

At the terminal device 1, under control of the character selection unit 123 of the game logic processing unit 12, the server accessing unit 13 sends the combination of characters to actually participate in the battle, in other words, the plurality of characters selected in step S112, with player ID to the game processing server 4 (step S113).

The request processing unit 41 of the game processing server 4 performs a battle process between the selected plurality of characters as battle members of the player against the enemy characters (step S114).

The request processing unit 41 of the game processing server 4 sends a battle process result to the terminal device 1 (step S115). The battle process result is a battle scene screen in which the battle process result is reflected, generated by the display screen generation unit 411, for example.

The screen display unit 14 of the terminal device 1 displays the battle scene screen (result) (step S116). For example, the statuses of the characters are changed when the HP or the MP of the characters on the player side or the enemy characters are consumed or the like by the battle process. Further, for example, when the battle is finished and the result (victory or defeat) is determined, the result is displayed.

Another Embodiment

In the above embodiment, a case of the application type in which the terminal device 1 executes the game logic based on the application previously downloaded and installed is explained. Next, as another embodiment, a case of the browser type in which the terminal device 1 performs the game logic based on page data described in a Hyper Text Markup Language (HTML) or the like and scripts or the like included in the page data sent from the game processing server apparatus 4 is explained.

(Function)

Figure 17:
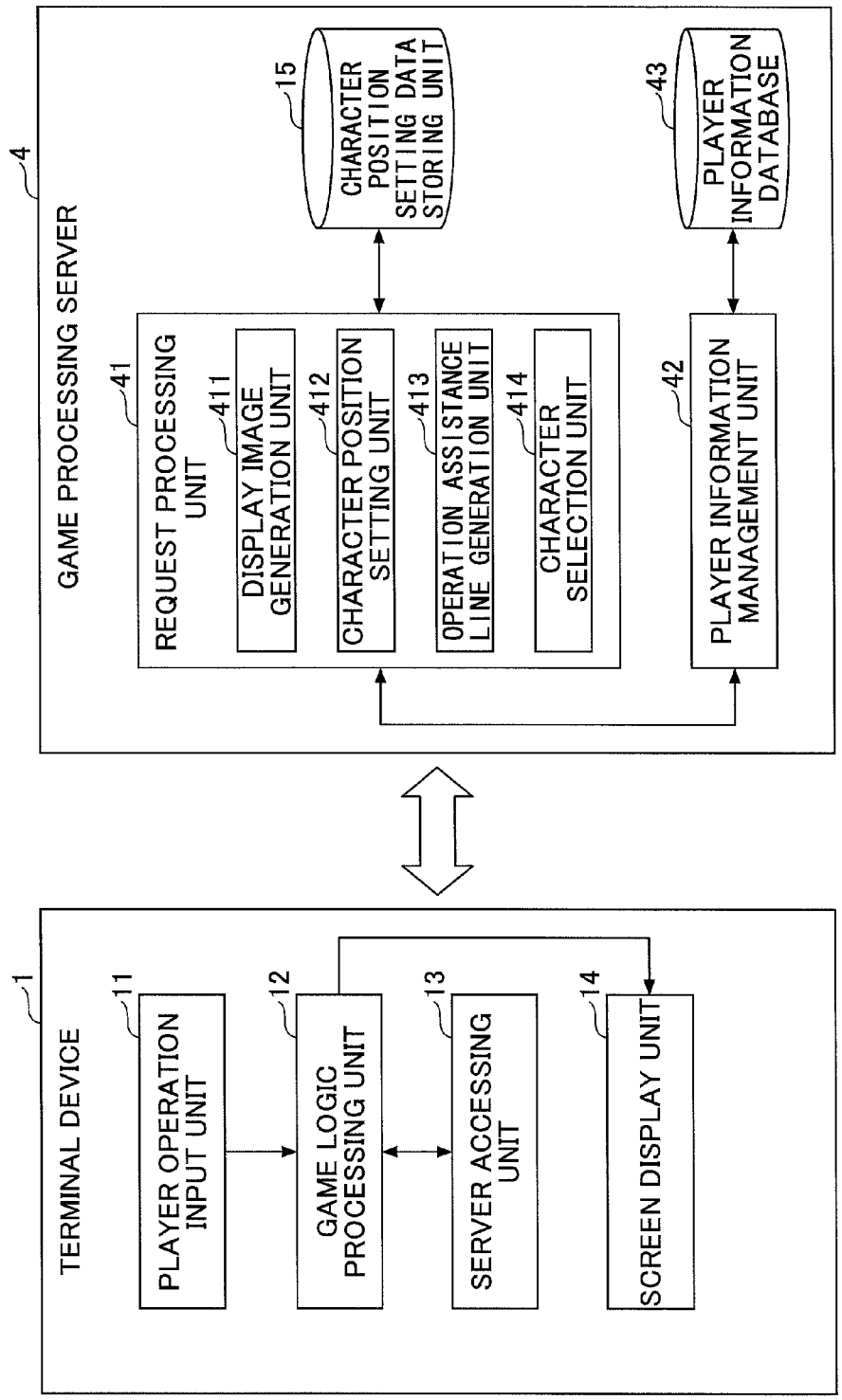
FIG. 17 is a block diagram illustrating another example of a functional structure of the terminal device and the game processing server.

FIG. 17 is a block diagram illustrating another example of a functional structure of the terminal device 1 and the game processing server 4 of the embodiment. The functions of the character position setting unit 121, the operation assistance line generation unit 122, the character selection unit 123 and the character position setting data storing unit 15 of the terminal device 1 illustrated in FIG. 4 are provided at the game processing server 4 side.

Specifically, the request processing unit 41 of the game processing server 4 includes a character position setting unit 412, an operation assistance line generation unit 413 and a character selection unit 414. The game processing server 4 includes a character position setting data storing unit 15.

The character position setting unit 412 has a function to position and set a plurality of candidate characters to participate in a battle game, which are selected by the player, at a plurality of predetermined character positioning areas (a matrix including 3×3 boxes, for example) provided for positioning the characters before starting the battle game, in response to a request from the terminal device 1.

When one of the characters is designated by an input operation of the player at the terminal device 1 after the battle is started, the operation assistance line generation unit 413 receives the input operation and generates an operation assistance line extending along the designated character as the base point and extending in a direction toward the character positioning area at which another character is positioned. The generated operation assistance line is reflected in a screen generated by the display image generation unit 411. Then, screen data generated by the display image generation unit 411 is sent to the terminal device 1 as a response and is displayed on the screen display unit 14 of the terminal device 1.

When one of the candidate characters is designated and a direction from the designated character having the designated character (input by the operation assistance line, for example) as the base point is designated by an input operation by the player at the terminal device 1 after the battle is started, the character selection unit 123 receives the input operation and selects the designated character and character(s) positioned at the character positioning area(s) (box(es), for example) on the selected direction (on the operation assistance line, for example) (on the line or in the vicinity of the line) as the selected combination of characters to actually participate in the battle. The selected process result is once reflected on a screen generated by the display image generation unit 411 and then sent to the terminal device 1 as a response to be displayed on the screen display unit 14 of the terminal device 1.

(Operation)

FIG. 18 is a sequence diagram illustrating an example of an operation of the embodiment for the browser type.

When the player requests a character positioning screen (see FIG. 7, for example) for character positioning, under control of the game logic processing unit 12, the server accessing unit 13 sends a request to set character positioning with player ID to the game processing server 4 (step S201).

At the game processing server 4, upon accepting the request to set character positioning, the character position setting unit 412 of the request processing unit 41 obtains information about possessing characters from the player information database 43 (see FIG. 5B, for example) via the player information management unit 42 using the player ID accepted with the request as a key. Then, the display screen generation unit 411 generate a character positioning screen including a possessing character list and sends it to the terminal device (step S202).

The screen display unit 14 of the terminal device 1 displays the character positioning screen (step S203). Specifically, the screen display unit 14 of the terminal device 1 displays the character positioning screen 700 as illustrated in FIG. 7 and the possessing character list 800 as illustrated in FIG. 8.

At the terminal device 1, when a candidate character and its position at the character positioning areas are input by the player (see FIG. 7 and FIG. 8, for example), the player operation input unit 11 accepts the information.

The server accessing unit 13 of the terminal device 1 sends the input by the player to the game processing server 4 (step S205).

At the game processing server 4, the character position setting unit 412 of stores the input candidate character in association with the input position at the character positioning areas, (see FIG. 9 and FIG. 10, for example) (see FIG. 9 and FIG. 10, for example) (step S206). Specifically, with reference to FIG. 6B, for example, the character position setting unit 121 stores character ID of the input candidate character in the "positioned character ID" in association with the respective identifier of the input position (box) in the "box in matrix" of the table stored in the character position setting data storing unit 15. The processes of steps S204 to S206 are repeated until the candidate characters are selected for all of the boxes of the matrix, all of the possessing characters are selected, or the like.

The display screen generation unit 411 of the request processing unit 41 generates the character positioning screen in which the candidate characters are positioned at the character positioning areas, respectively, and sends it to the terminal device 1 (step S207).

Thereafter, when the player operates the terminal device 1 to start the battle game, under control of the game logic processing unit 12, the server accessing unit 13 sends a request to start the battle game with player ID to the game processing server 4 (step S208).

At the game processing server 4, the display screen generation unit 411 of the request processing unit 41 generates various scenes in accordance with progressions of the battle game and sends the generated scenes to the terminal device 1. Further, when a battle is started, the display image generation unit 411 of the request processing unit 41 generates a battle scene screen and sends it to the terminal device 1 (step S208). The battle scene screen includes the character board 107 at which the candidate characters are positioned.

The screen display unit 14 of the terminal device 1 displays the battle scene screen (step S210). Specifically, the screen display unit 14 displays the character selection screen 1100a as illustrated in FIG. 11.

At the terminal device 1, when one of the candidate characters in the character board 107 is designated by the player (see FIG. 12, for example), the player operation input unit 11 accepts the information (step S211).

The server accessing unit 13 of the terminal device 1 sends the input by the player to the game processing server 4 (step S212).

When the designation of the one of the candidate characters is accepted, the operation assistance line generation unit 413 of the game processing server 4 generates operation assistance lines that extends along the designated character as the base point toward directions in which the character positioning areas (the boxes of the matrix) where other characters are positioned (step S213).

At this time, the operation assistance line generation unit 413 may refer to the table for storing the candidate characters positioned at the character positioning areas, respectively, as illustrated in FIG. 6B, stored in the character position setting data storing unit 15. Then, the operation assistance line generation unit 413 may generate operation assistance lines that pass the boxes defined in the "selectable combination" based on the data in the "selectable combination" corresponding to the identifier of the box of the designated character in the "box in matrix" based on the data of the "selectable combination" (see FIG. 6B, for example).

The display screen generation unit 411 of the request processing unit 41 generates a battle scene screen including the generated operation assistance lines and sends it to the terminal device 1 (step S214). Alternatively, only the generated operation assistance lines may be sent to the terminal device 1 in order to reduce the amount of the data.

The screen display unit 14 of the terminal device 1 displays the battle scene screen including the operation assistance lines (step S215) (see FIG. 12, for example).

When only the generated operation assistance lines are received, the currently received operation assistance lines are used as a differential image so that the screen display unit 14 may overlap the currently received operation assistance lines on the battle scene screen, which is previously received, to display them together.

At the terminal device 1, when one of the operation assistance lines is designated by the player (see FIG. 13, for example), the player operation input unit 11 accepts the information (step S216).

The server accessing unit 13 of the terminal device 1 sends the input by the player to the game processing server 4 (step S217).

At the game processing server 4, when one of the characters is designated and one of the operation assistance lines (direction information from the designated character having the designated character as the base point) is designated, the character selection unit 414 of the request processing unit 41 selects the characters (including the designated character) positioned at the character positioning areas (boxes of the matrix, for example) on the designated operation assistance line (on the line or in the vicinity of the line) as the combination of characters to actually participate in the battle (step S218) (see FIG. 13 and FIG. 14, for example).

The request processing unit 41 of the game processing server 4 performs a battle process between the selected plurality of characters as battle members of the player against the enemy characters (step S219).

The request processing unit 41 of the game processing server 4 sends a battle process result to the terminal device 1 (step S220). The battle process result is a battle scene screen in which the battle process result is reflected, generated by the display screen generation unit 411, for example.

The screen display unit 14 of the terminal device 1 displays the battle scene screen (result) (step S221). For example, the statuses of the characters are changed when the HP or the MP of the characters on the player side or the enemy characters are consumed or the like by the battle process. Further, for example, when the battle is finished and the result (victory or defeat) is determined, the result is displayed.

The above described sequences of the application type and the browser type are just an example. The functions of the terminal device 1 and the game processing server 4 may be arbitrarily altered in accordance with necessity.

As described above, according to the embodiment, the following advantages can be obtained, for example.

(1) A player can select a plurality of characters by a series of simple and quick operations of tapping and swiping, for example. Thus, as the selection is performed within a short period, the sense of being engaged or immersed in the battle scene may be retained and it is unnecessary to have an opposite player in an on-line game wait for the selection.

(2) As a plurality of operation assistance lines extending along the designated character as a base point in multiple directions are displayed, the player can intuitively determine the selectable characters.

(3) Further, according to the game rule, the selectable characters are limited to the characters that are positioned on one of the operation assistance lines extending along the designated character as the base point. As the characters have different abilities, it is necessary for the player to strategically position the candidate characters at predetermined character positioning areas by considering the abilities of the characters. Thus, interesting in the game is further increased.

The individual constituents of the terminal device 1 and the game processing server 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

According to the embodiments, a game providing apparatus and a recording medium by which a player can strategically select characters with a short period can be provided.

Although a preferred embodiment of the terminal device 1 and the game processing server 4 has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

In the above embodiment, a matrix having 3×3 boxes, where each of the boxes has a four-square shape, is exemplified as the character positioning areas (a character board, for example). However, the character positioning areas are not limited to a matrix having boxes of the four-square shape.

Figure 19C:
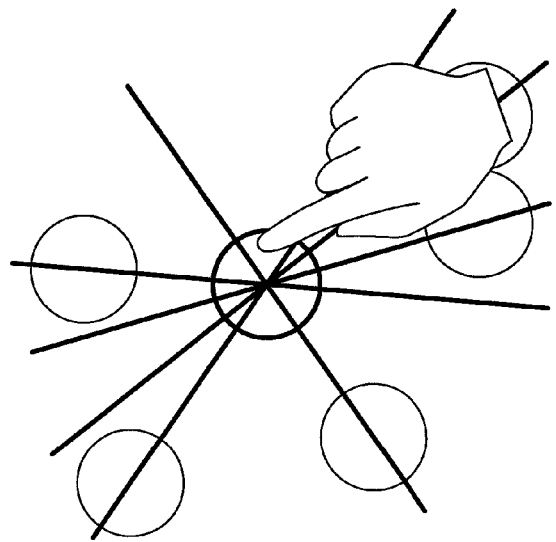
FIG. 19A to FIG. 19C are respective views illustrating alternative examples of character positioning areas.
Figure 19B:
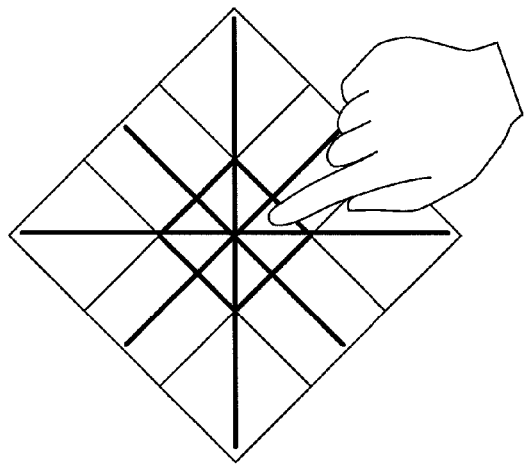
Figure 19A:
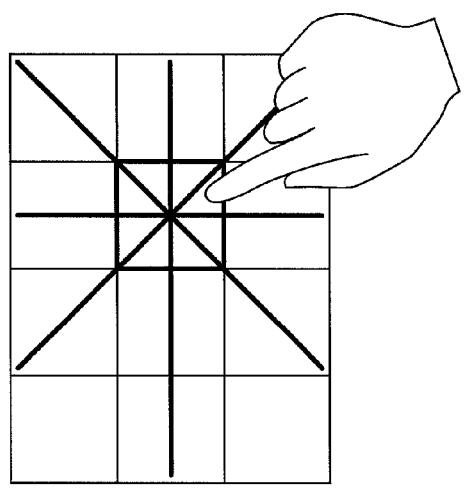

FIG. 19A to FIG. 19C are respective views illustrating alternative examples of the character positioning areas.

In FIG. 19A, the character positioning areas are a matrix having 4×3 boxes. In this example, four candidate characters may be selected only when an operation assistance line extending in the lateral direction, as illustrated. The selectable number of the characters is determined by a game rule.

In FIG. 19B, the character positioning areas are a matrix having 3×3 boxes, where each of the boxes has a rhombus shape.

In FIG. 19C, the character positioning areas are a plurality of circle areas that are randomly placed. At this time, operation assistance lines, in multiple directions, extending on the tapped candidate character as the base point and at least one of other candidate characters, are displayed, as illustrated. Thus, at this time, the number of candidate characters positioned on each of the operation assistance lines is different for each of the operation assistance lines, and the number of the selected candidate characters may not be constant. Rather, in this example, by arbitrarily positioning candidate characters within a predetermined frame area, not fixing boxes, the number of characters that can participate in the battle may vary in accordance with the position of the designated character and the designated operation assistance line. At this time, the player can advantageously position candidate characters by arbitrarily positioning the candidate characters, under a limited condition such as before starting the battle (before meeting enemies) or the like (improvement in a strategic operation).

Further, in the above alternative examples, the operation assistance lines may not be displayed. For example, when the player is used to playing the battle game, the player may set "not to display the operation assistance lines", for example, so that the operation assistance lines are not displayed.

At this time, the player may select characters to actually participate in the battle by, first, tapping one of the candidate characters to designate, and then performing an operation (swiping or flicking, for example) in a direction where at least one of the other candidate characters exists from the designated character having the designated character as the base point, without using the operation assistance lines. With this operation, the designated character and the candidate character(s) exist on a line extending in the direction operated by the player are selected as the selected combination of characters to actually participate in the battle.

FIG. 20A and FIG. 20B are respective views illustrating alternative examples of the character positioning areas.

In these examples, the character positioning areas are displayed at a position facing the enemy characters. With this configuration, realistic in the battle can be further improved.

In FIG. 20A, frame lines of the matrix are not displayed. With this configuration, the player may feel that the character candidates are positioned in a battlefield in front of the enemy characters, not the character board so that the realistic feeling in a battle scene can be increased.

In FIG. 20B as well, frame lines of the matrix are not displayed. Further, candidate characters (character positioning areas) are to be arbitrarily positioned within a predetermined frame area, not fixing boxes, as illustrated in FIG. 19C. At this time, the player can advantageously position candidate characters by arbitrarily positioning the candidate characters, under a limited condition such as before starting the battle (before meeting enemies) or the like (improvement in a strategic operation).

Alternatively, the predetermined plurality of character positioning areas are provided to have a matrix having n×n boxes, where "n" expresses the number of friend characters capable of actually participating in a battle.

The present application is based on and claims the benefit of priority of Japanese Priority Application No. 2012-250195 filed on Nov. 14, 2012, the entire contents of which are hereby incorporated by reference.

What is claimed is:

1. A non-transitory computer-readable recording medium having recorded thereon a program that causes a computer, which is a terminal device connected to a game providing apparatus to be capable of having communication with the game providing apparatus to perform a game in which a player selects a plurality of characters to participate in the game, to execute functions comprising:

a screen display function that displays a plurality of character positioning areas at which a plurality of characters are to be positioned, respectively, and a plurality of characters positioned at the plurality of character positioning areas, respectively; and a character selection function that selects, when one of the characters is designated and a direction from the designated character having the designated character as a base point is designated, the designated character and the character positioned at the character positioning area that are in the designated direction, as a combination of characters to actually participate in the battle, wherein the character positioning areas are a matrix including a predetermined number of boxes in a column direction and a predetermined number of boxes in a row direction, and wherein the character selection function selects, when a character positioned at one of the boxes is designated and the column direction, the row direction, or an oblique direction from the designated character having the designated character as the base point is designated, the designated character and the character positioned at the box in the designated direction, as the combination of characters to actually participate in the battle.

2. The non-transitory computer-readable recording medium according to claim 1,
wherein the matrix includes three boxes in the column direction and three boxes in the row direction.

3. The non-transitory computer-readable recording medium according to claim 1, the functions further comprising:
an operation assistance line generation function that generates, when one of the characters is designated, an operation assistance line extending from the designated character having the designated character as the base point in a direction toward at least one of the character positioning areas on which another character is positioned, and has the screen display function display the operation assistance line,
wherein the direction is designated by designating the operation assistance line, and
wherein the character selection function selects the characters positioned at the character positioning areas that are on the designated operation assistance line including the designated character, as the combination of characters to actually participate in the battle.

4. The non-transitory computer-readable recording medium according to claim 3,
wherein the terminal device includes a touch type input unit, and
wherein the character is designated by a tapping operation to the character and the direction is designated by a swiping or flicking operation along the operation assistance line.

5. The non-transitory computer-readable recording medium according to claim 1, the functions further comprising:
a position setting function to set a plurality of characters at the character positioning areas, and
wherein the character selection function selects the designated character while performing the battle game.

6. The non-transitory computer-readable recording medium according to claim 1,
wherein the plurality of characters have different game effects, respectively.

7. A game providing apparatus connected to a terminal device to be capable of having communication with the terminal device to provide a game in which a player selects a plurality of characters to participate in the game, comprising:

a display image generation unit that synthesizes a plurality of character positioning areas at which a plurality of characters are to be positioned, respectively, and a plurality of characters positioned at the plurality of character positioning areas, respectively, to have the terminal device display the synthesized image; and a character selection unit that selects, when one of the characters is designated and a direction from the designated character having the designated character as a base point is designated by the terminal device, the designated character and the character positioned at the character positioning area that are in the designated direction, as a combination of characters to actually participate in the battle, wherein the character positioning areas are a matrix including a predetermined number of boxes in a column direction and a predetermined number of boxes in a row direction, and wherein the character selection unit selects, when a character positioned at one of the boxes is designated and the column direction, the row direction, or an oblique direction from the designated character having the designated character as the base point is designated by the terminal device, the designated character and the character positioned at the character positioning area that are in the designated direction, as a combination of characters to actually participate in the battle.

8. The game providing apparatus according to claim 7,
wherein the matrix includes three boxes in the column direction and three boxes in the row direction.

9. The game providing apparatus according to claim 7, further comprising:
an operation assistance line generation unit that generates, when one of the characters is designated by the terminal device, an operation assistance line extending from the designated character having the designated character as the base point in a direction toward at least one of the character positioning areas on which another character is positioned, and has the terminal device display the operation assistance line,
wherein the direction is designated by designating the operation assistance line, and
wherein the character selection unit selects the characters positioned at the character positioning areas that are on the designated operation assistance line including the designated character, as the combination of characters to actually participate in the battle.

10. The game providing apparatus according to claim 7, further comprising:
a position setting unit to set a plurality of characters at the character positioning areas, and
wherein the character selection unit selects the designated character while performing the battle game.

11. The game providing apparatus according to claim 7,
wherein the plurality of characters have different game effects, respectively.

* * * * *